United States Patent
Lopez et al.

(10) Patent No.: US 10,604,229 B2
(45) Date of Patent: Mar. 31, 2020

(54) MONO-RAIL CRANE SYSTEM IN AN AIRCRAFT

(71) Applicants: Airbus Defence and Space GmbH, Taufkirchen (DE); Airbus Defence and Space S.A., Madrid (ES)

(72) Inventors: Ana Rubio Lopez, Madrid (ES); Daniel Llanes Arias, Bargas (ES); Oscar Martinez, Madrid (ES); Ali Lohmann, Sottrum (DE); Ulrich Weiss, Weyhe (DE)

(73) Assignees: AIRBUS DEFENCE AND SPACE S.A., Madrid (ES); AIRBUS DEFENCE AND SPACE GMBH, Taufkirchen (DE)

( * ) Notice: Subject to any disclaimer, the term of this patent is extended or adjusted under 35 U.S.C. 154(b) by 492 days.

(21) Appl. No.: 15/615,083

(22) Filed: Jun. 6, 2017

(65) Prior Publication Data

US 2017/0349263 A1    Dec. 7, 2017

(30) Foreign Application Priority Data

Jun. 7, 2016    (EP) .................................... 16380027

(51) Int. Cl.
*B64C 1/22*     (2006.01)
*B64C 1/14*     (2006.01)
(Continued)

(52) U.S. Cl.
CPC .............. *B64C 1/22* (2013.01); *B64C 1/1415* (2013.01); *B64F 1/32* (2013.01); *B64D 9/00* (2013.01); *B66C 19/002* (2013.01)

(58) Field of Classification Search
CPC . B64C 1/22; B64C 1/1415; B64F 1/32; B66C 19/002; B64D 9/00
See application file for complete search history.

(56) References Cited

U.S. PATENT DOCUMENTS 3,051,419 A * 8/1962 Weiland .................... B64C 1/22
244/137.1
3,371,891 A    3/1968 Brader et al.
(Continued)

FOREIGN PATENT DOCUMENTS

EP    0294278    12/1988
GB    1228469    4/1971

OTHER PUBLICATIONS

European Search Report, dated Nov. 8, 2016, priority document.

*Primary Examiner* — Kaitlin S Joerger
(74) *Attorney, Agent, or Firm* — Greer, Burns & Crain, Ltd.

(57) ABSTRACT

A mono-rail crane system (and a corresponding operation method) for use in an aircraft. The crane system comprises a first longitudinal mono-rail installable on the underside of a rear cargo door of the airplane parallel to the longitudinal axis of the rear cargo door; a second longitudinal mono-rail, which is installable on a cargo hold ceiling of the aircraft, and, in the fully opened state of the rear cargo door, in aligned continuity with the first longitudinal mono-rail so that the longitudinal axes of the first and second longitudinal mono-rails coincide to form one common longitudinal axis; a crane mobile equipment configured to be moved along the first and second longitudinal mono-rails in order to hoist and transfer the load; and a linear actuator configured to advance and retreat the second longitudinal monorail towards and away from the first longitudinal monorail.

15 Claims, 31 Drawing Sheets

(51) Int. Cl.
   *B64F 1/32* (2006.01)
   *B64D 9/00* (2006.01)
   *B66C 19/00* (2006.01)

(56) References Cited

U.S. PATENT DOCUMENTS

| | | | | |
|---|---|---|---|---|
| 3,463,334 | A | * | 8/1969 | Longmire ................. B64C 1/22 244/137.1 |
| 3,552,587 | A | * | 1/1971 | Warren ..................... B64C 1/22 244/137.1 |
| 3,561,704 | A | * | 2/1971 | Schulze ................ B64C 1/1415 244/137.1 |
| 3,952,974 | A | * | 4/1976 | Lang ........................ B64C 1/22 244/137.1 |
| 4,858,855 | A | * | 8/1989 | Dalbera ................... B64C 1/22 244/137.1 |
| 5,647,577 | A | * | 7/1997 | Feldman .................. B60P 1/54 188/68 |
| 5,908,279 | A | * | 6/1999 | Mote ....................... B60P 3/224 414/542 |

\* cited by examiner

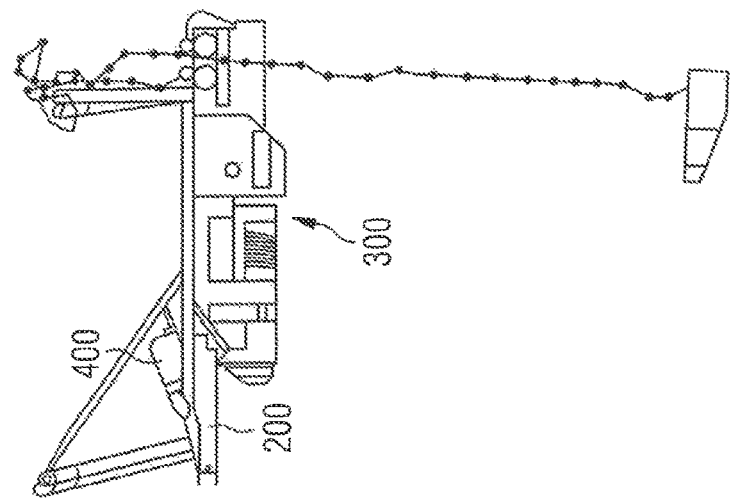
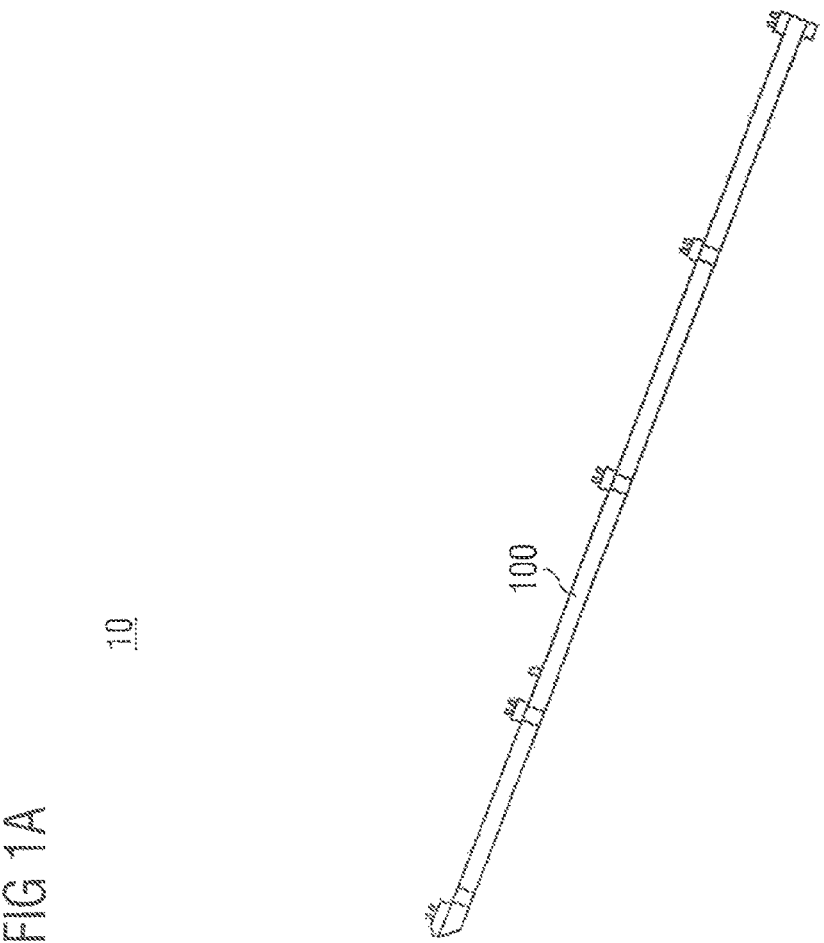
FIG 1A

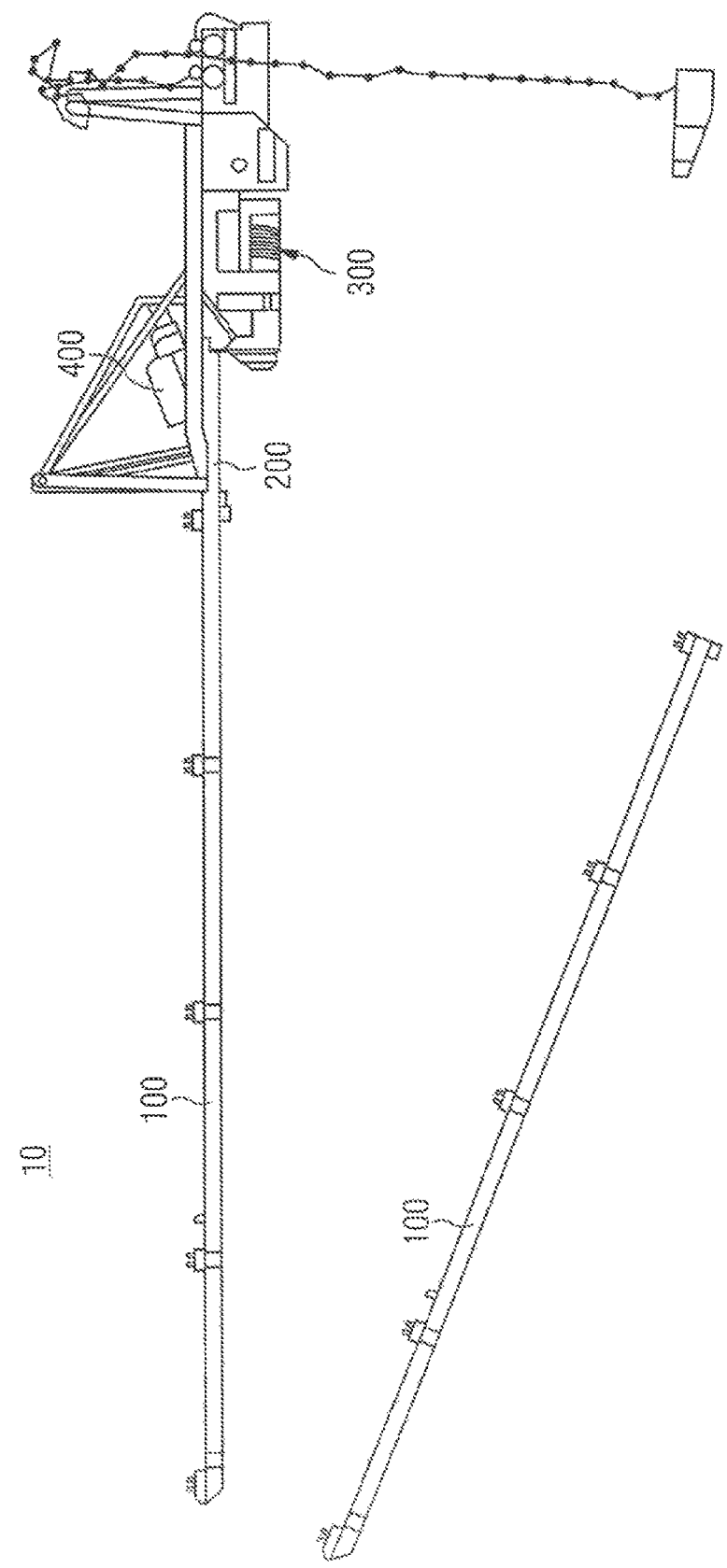

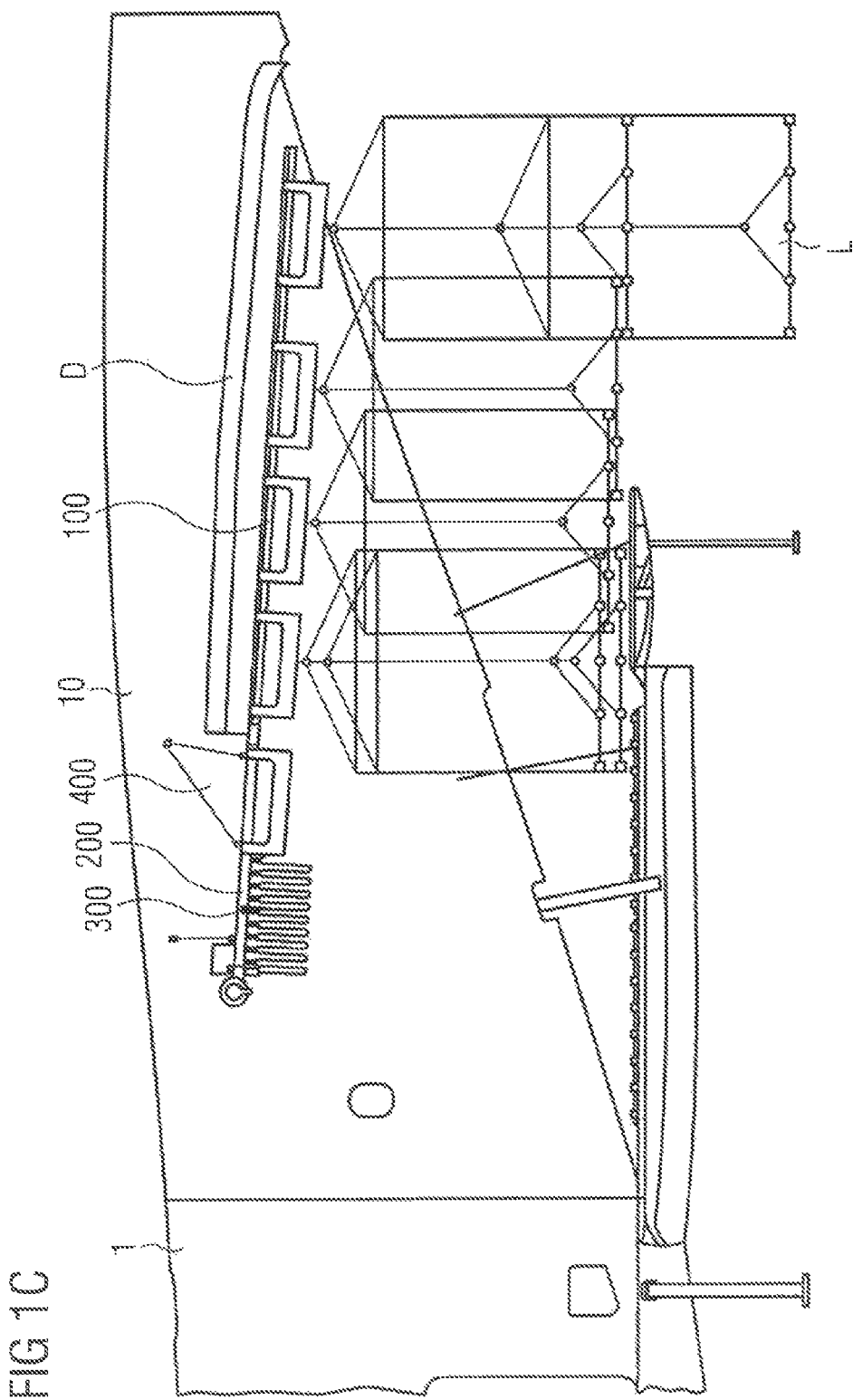

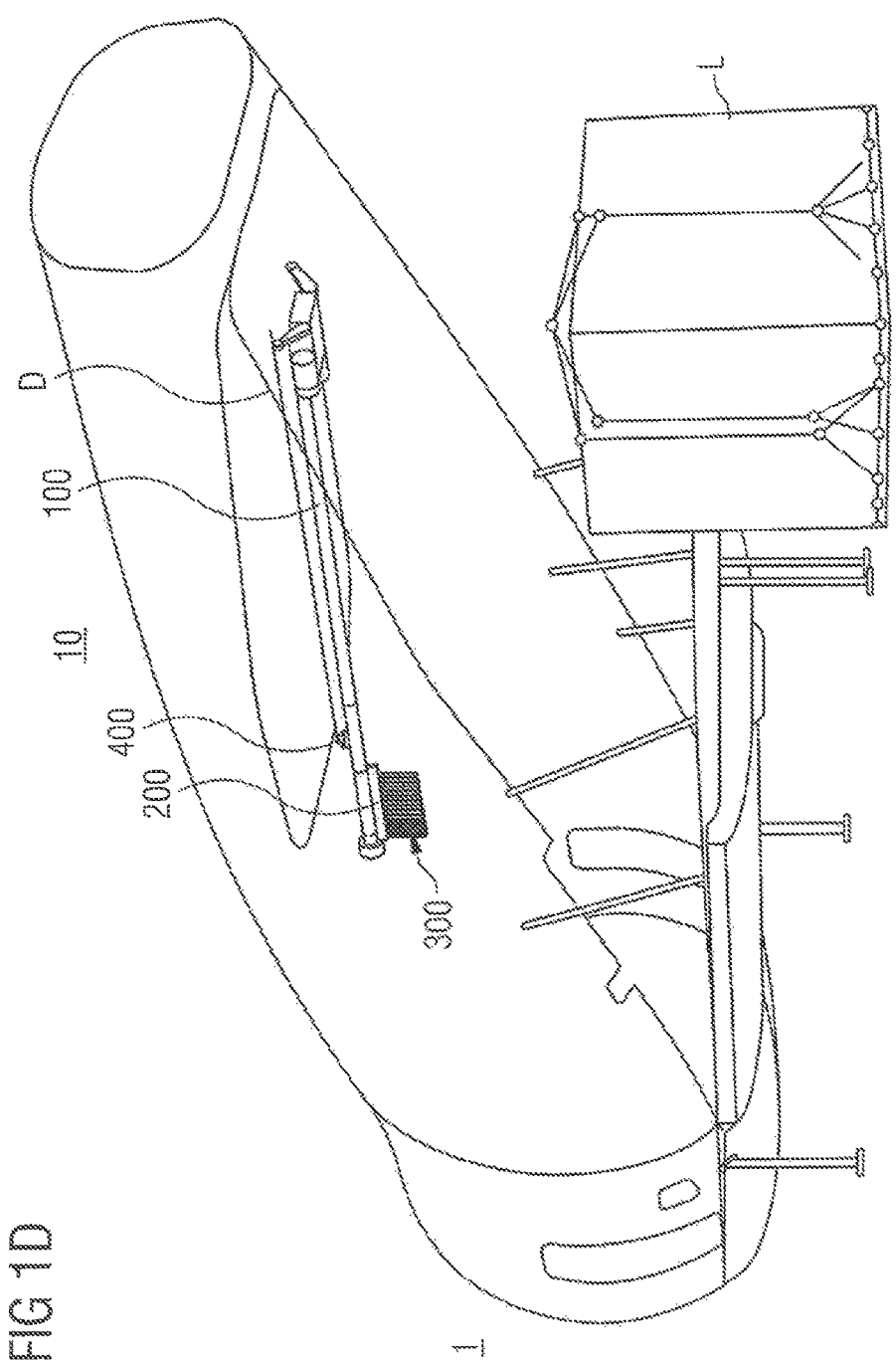

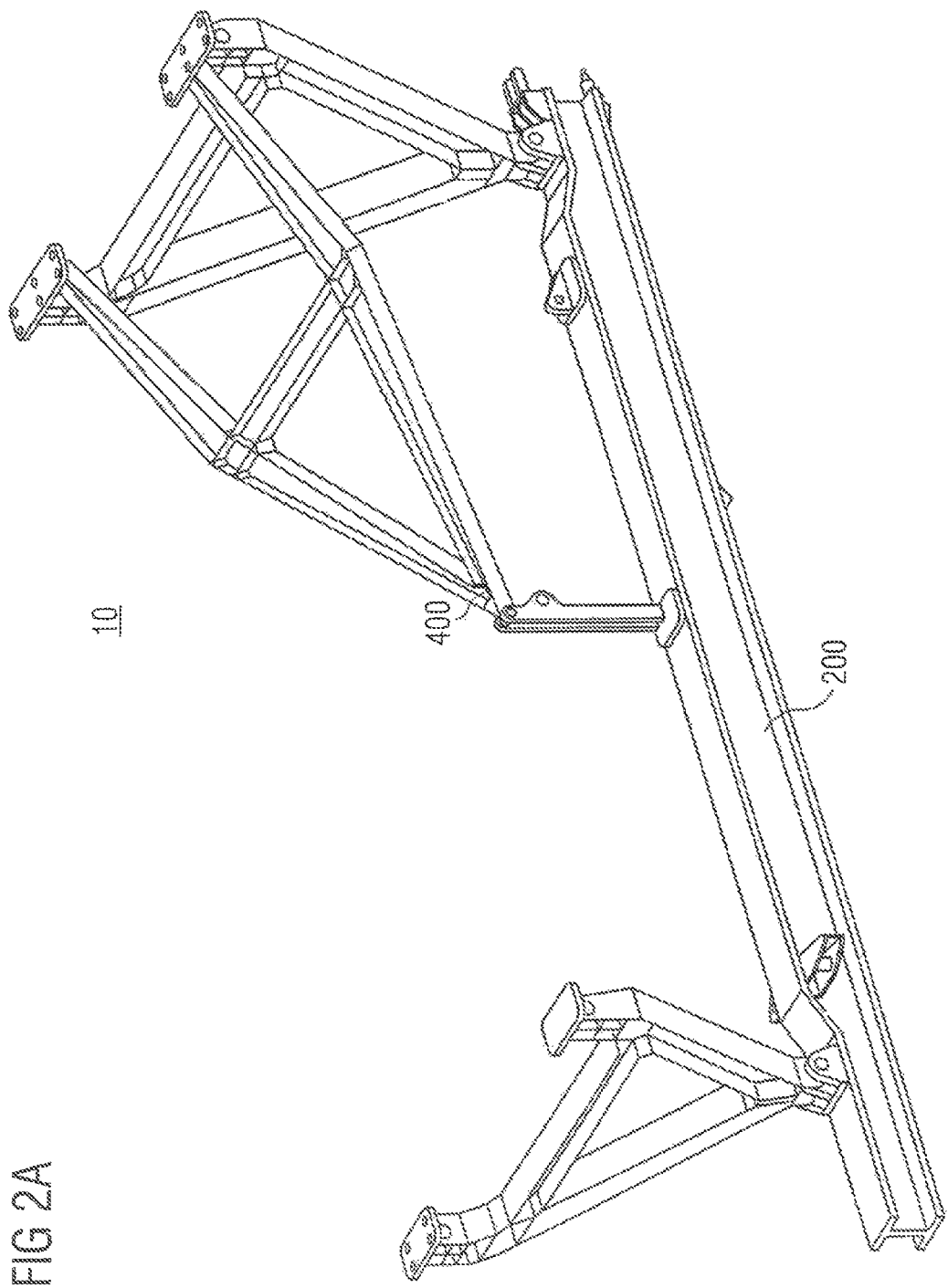

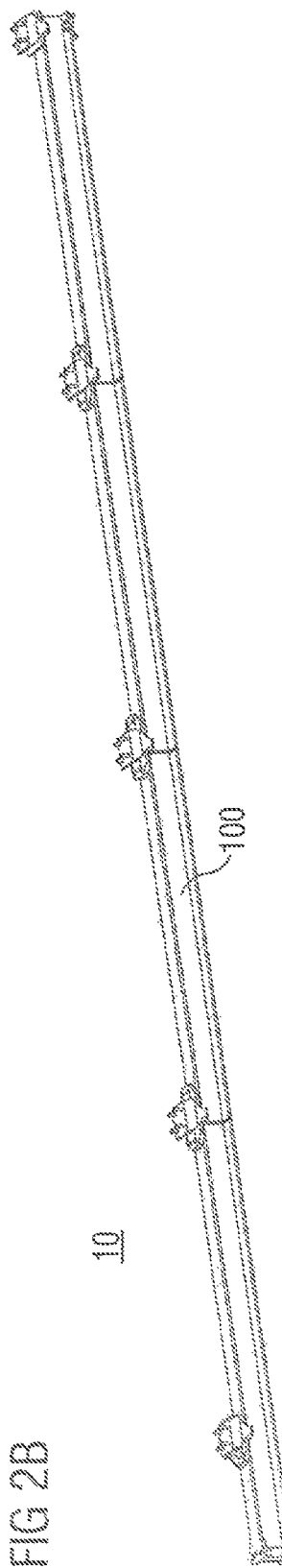

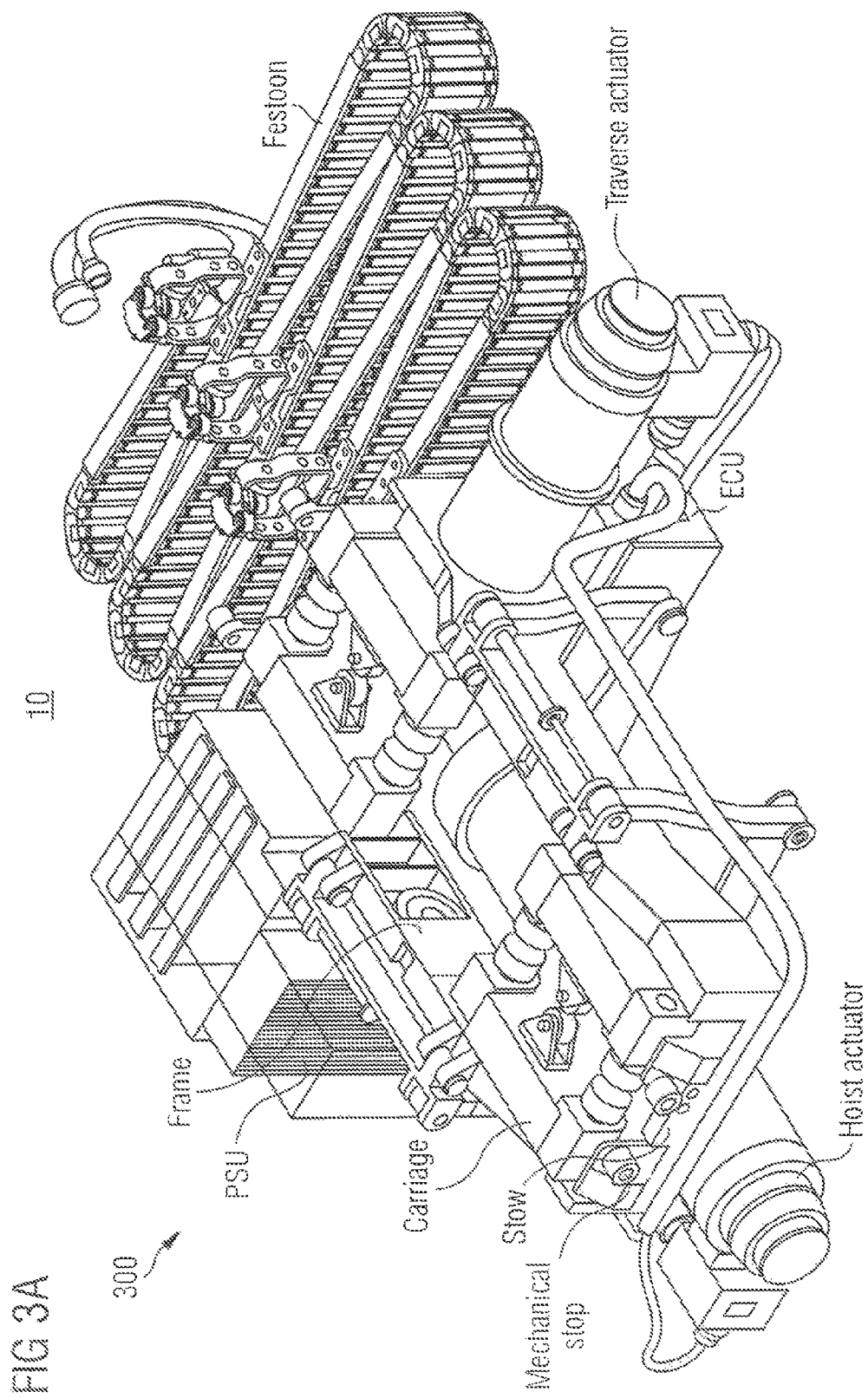

10

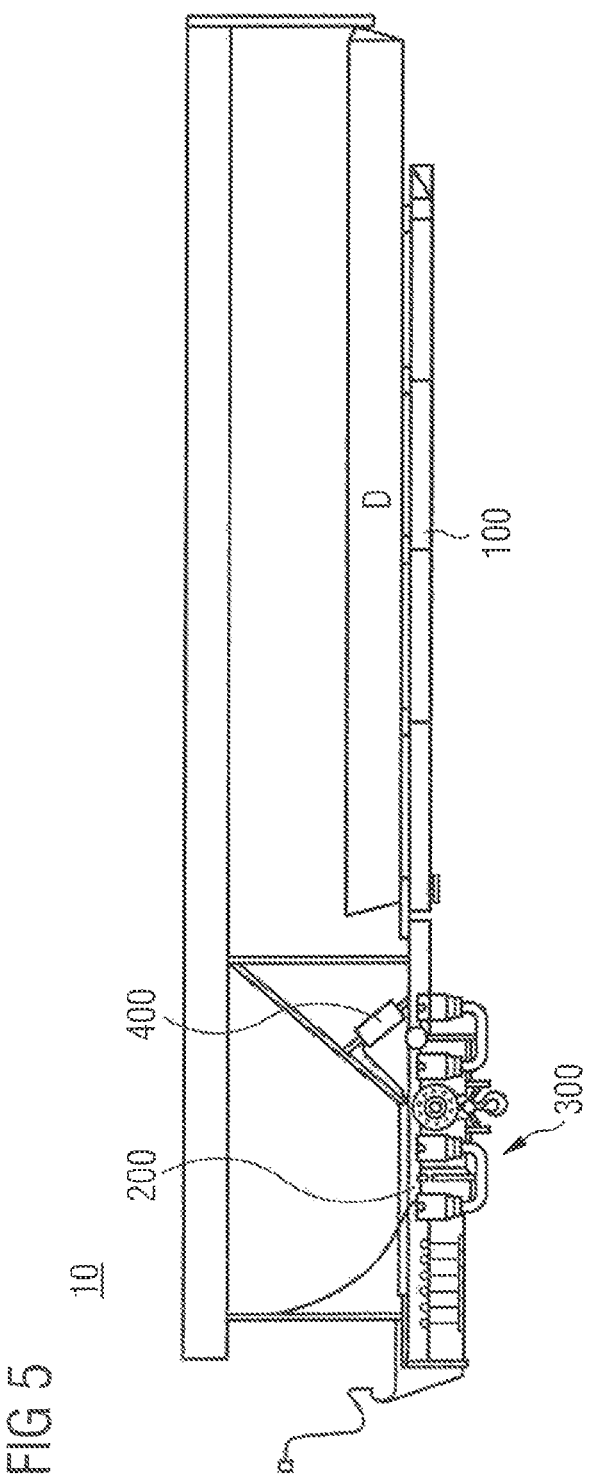

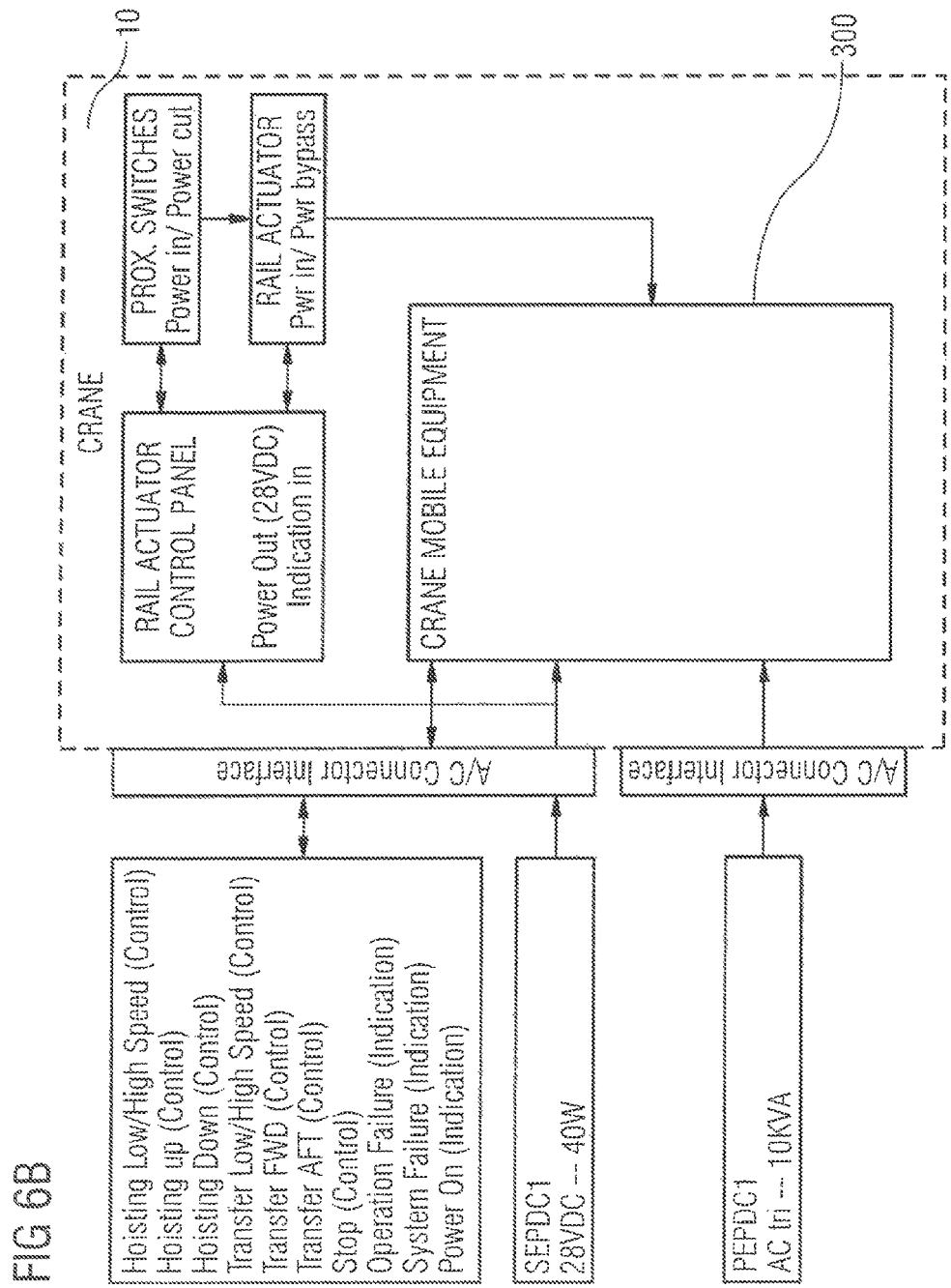

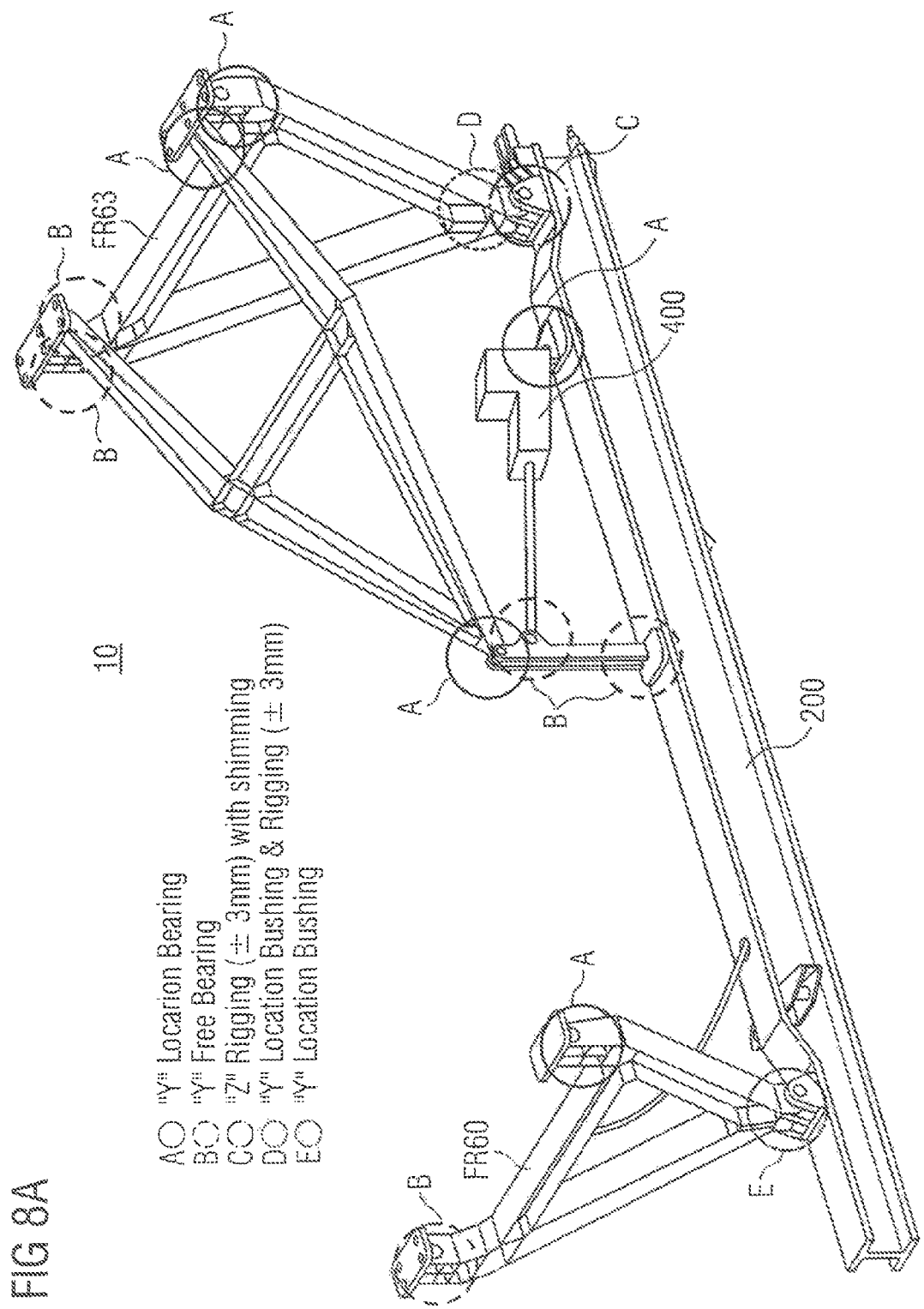

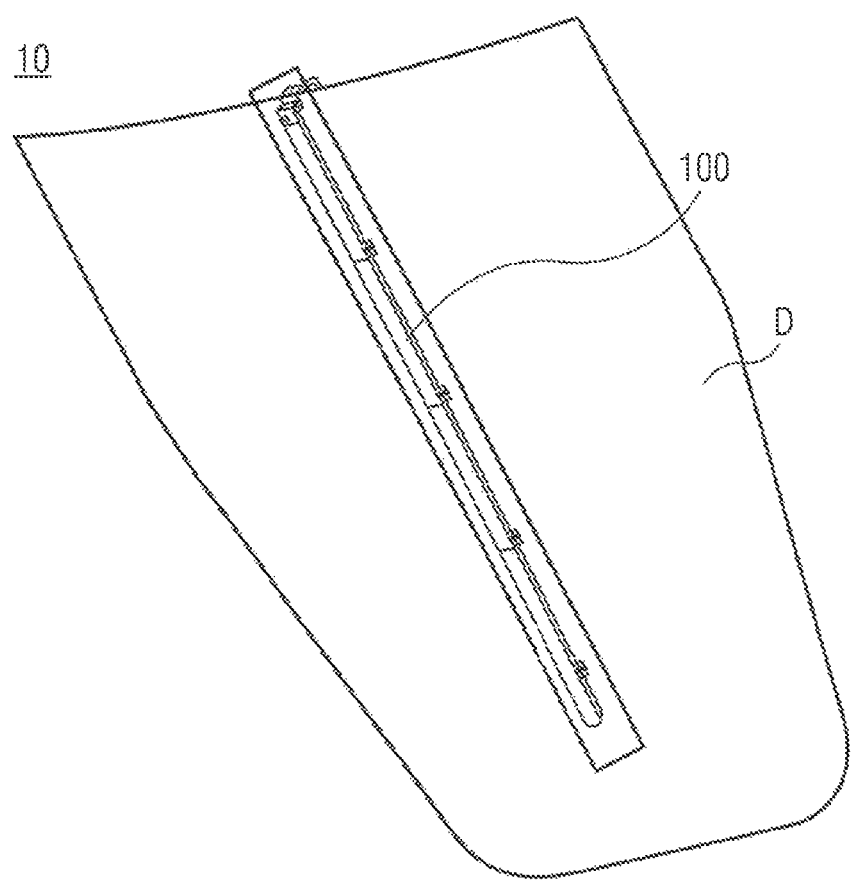

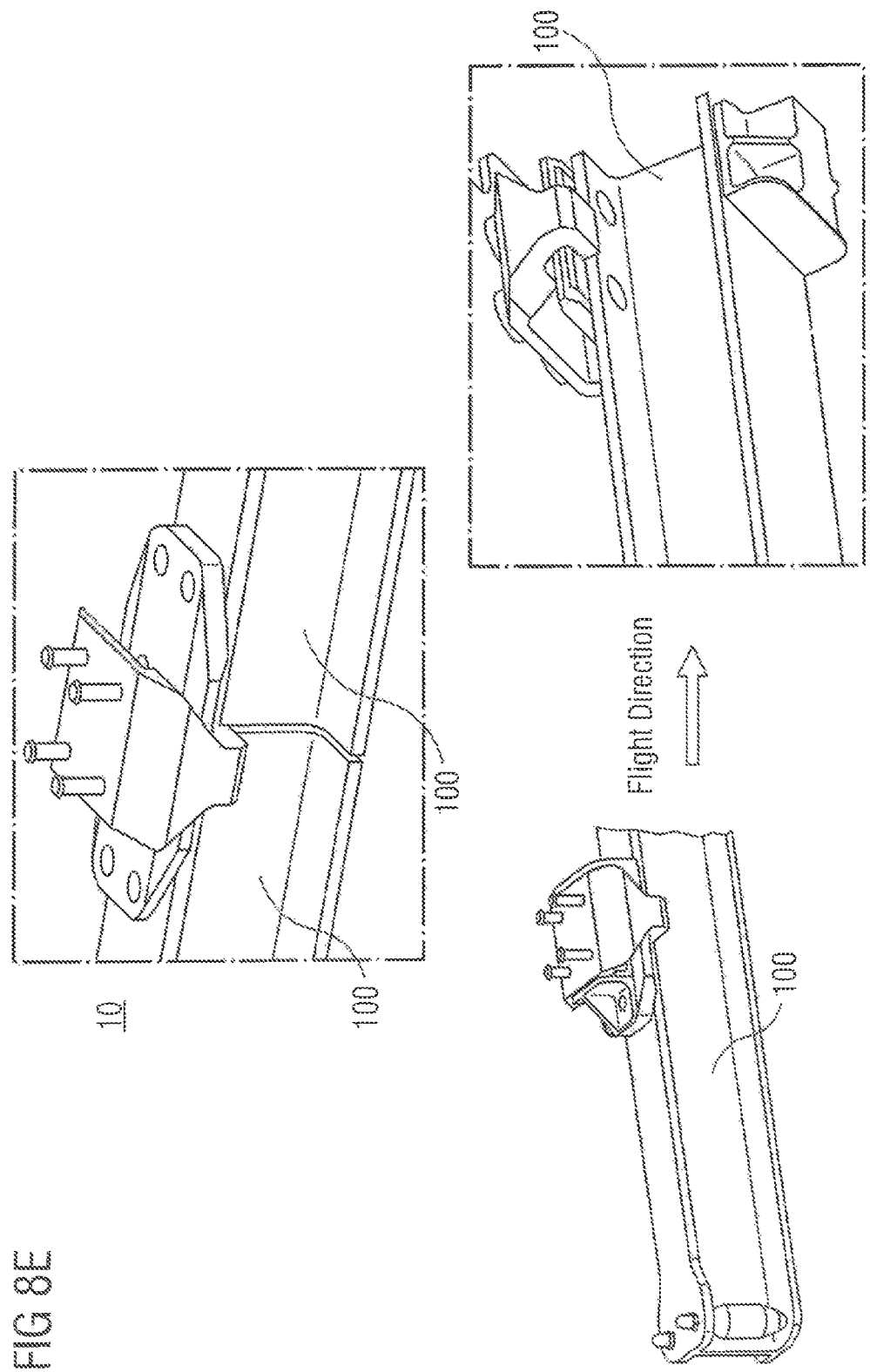

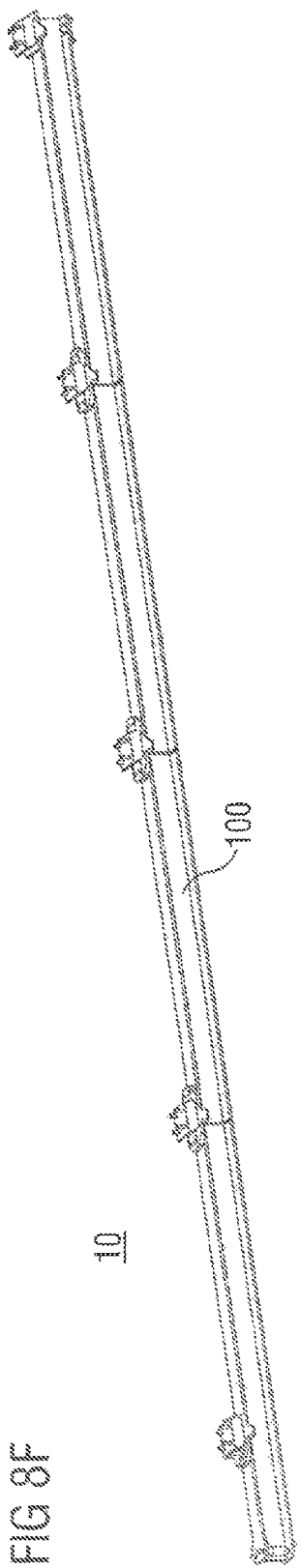

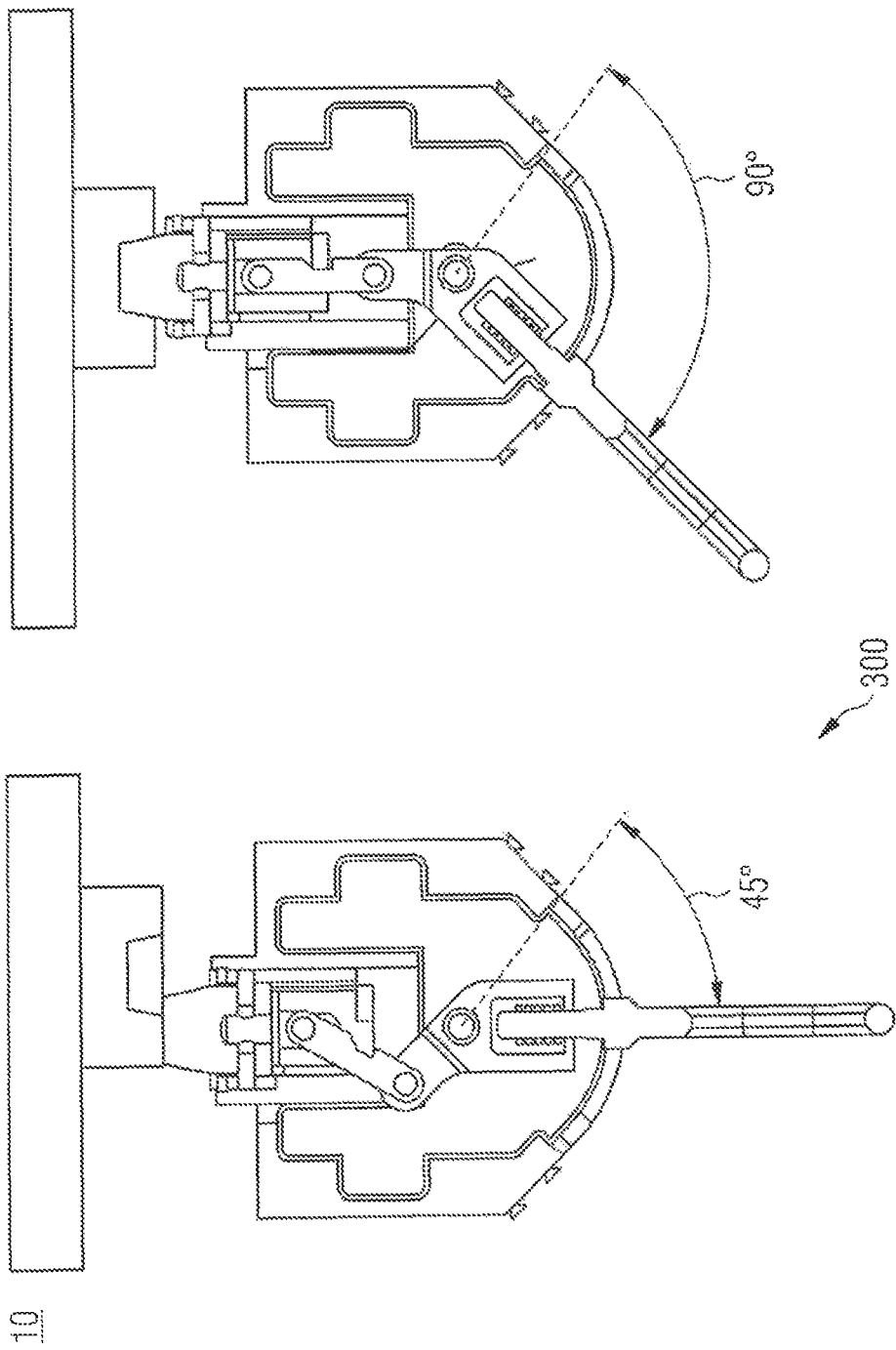

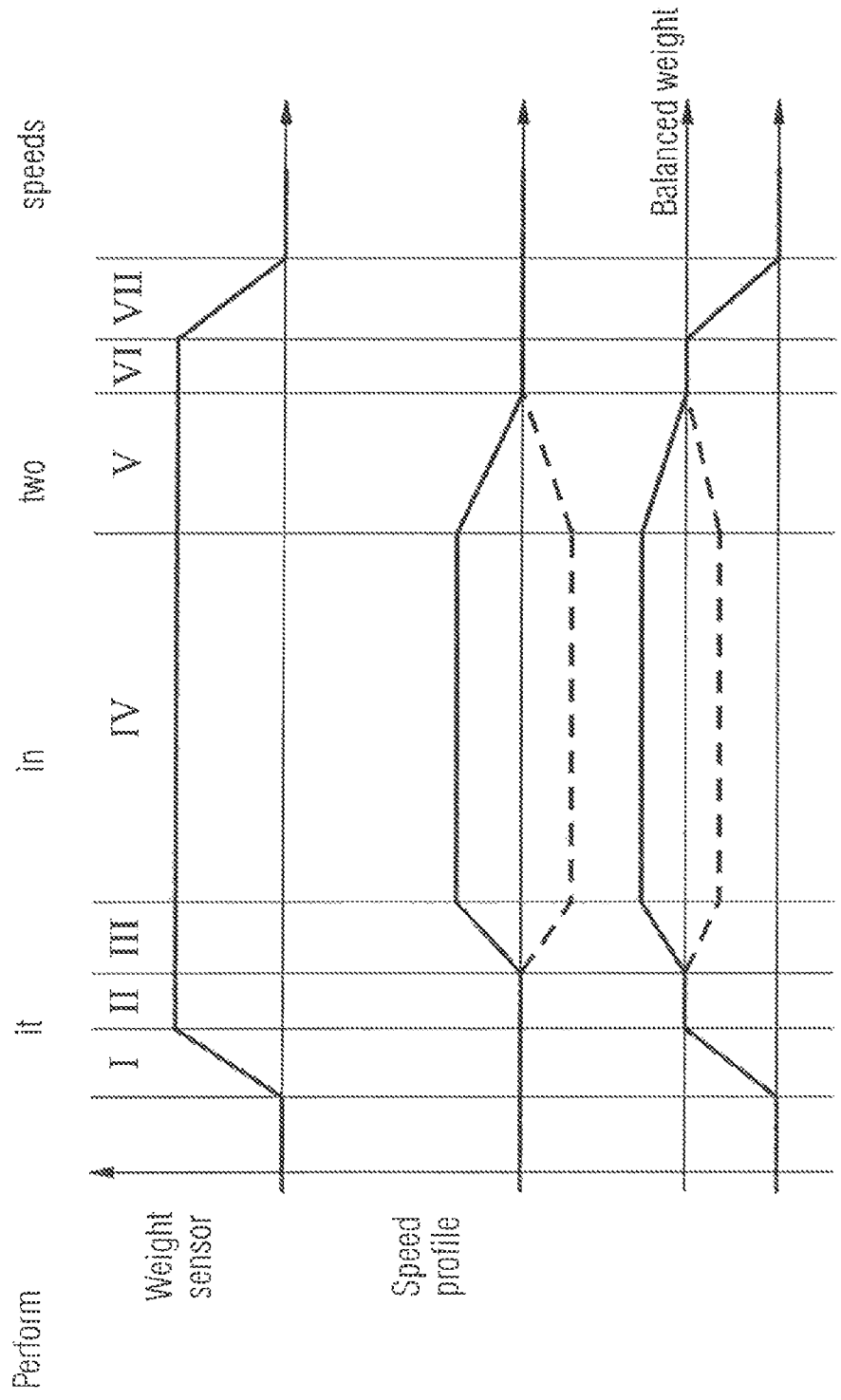

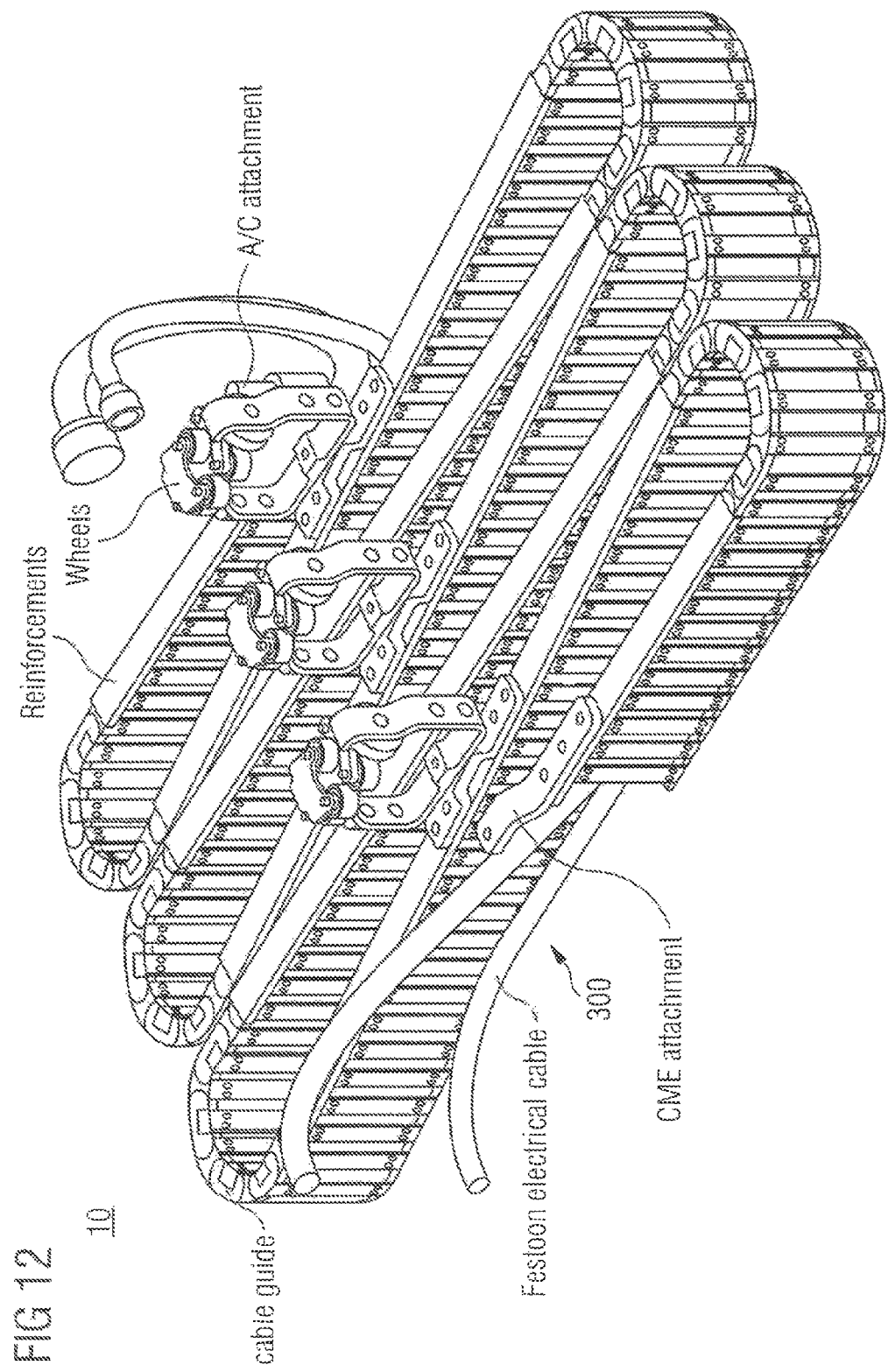

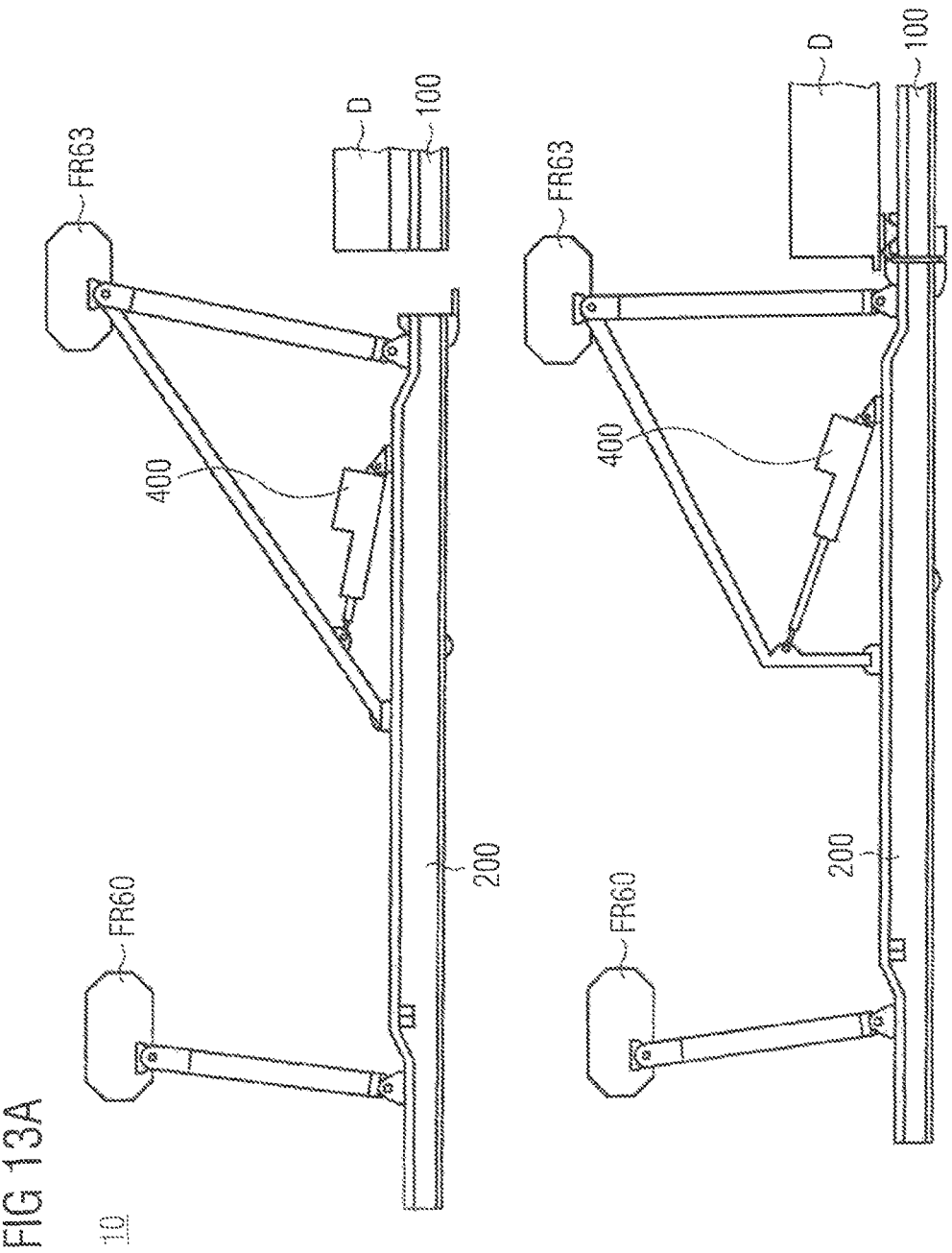

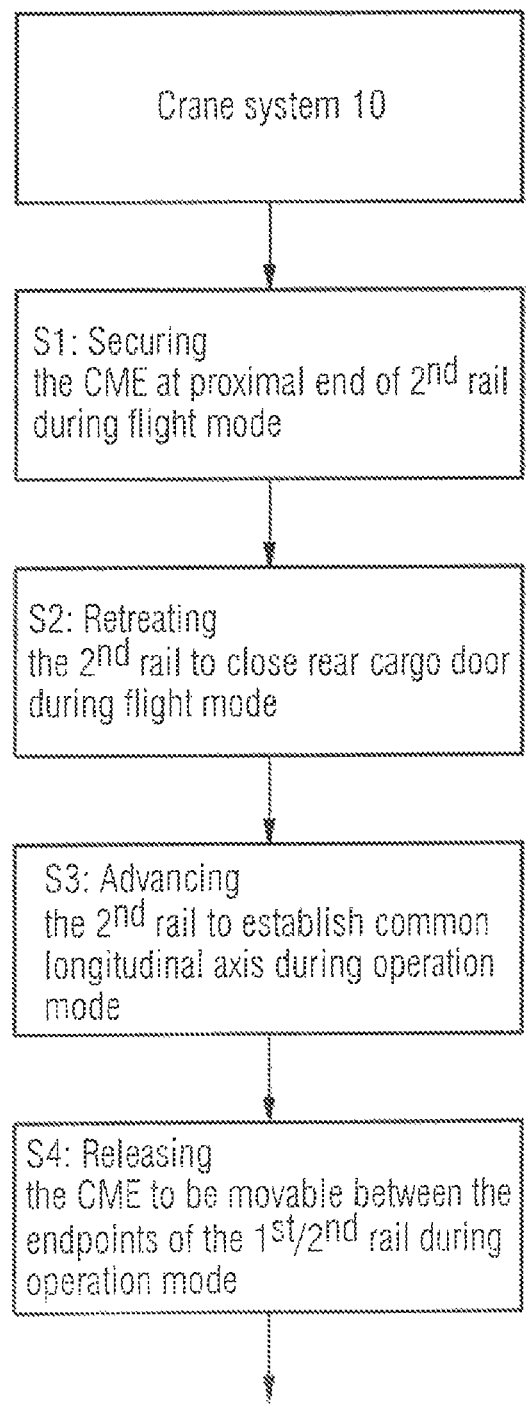

MONO-RAIL CRANE SYSTEM IN AN AIRCRAFT

CROSS-REFERENCES TO RELATED APPLICATIONS

This application claims the benefit of the European patent application No. 16 380 027.9 filed on Jun. 7, 2016, the entire disclosures of which are incorporated herein by way of reference.

BACKGROUND OF THE INVENTION

The present disclosure generally relates to a mono-rail crane system in an aircraft. In particular, the present disclosure relates to a mono-rail crane system in an aircraft enabling the transfer of loads from outside the aircraft into the aircraft, and the other way around.

Transferring loads from/into the cargo bay of an aircraft is an integral part of air traffic nowadays. As far as lighter loads (such as suitcases) are involved, the classical inclined conveyor belt can be used.

When it comes to transferring more heavy loads (such as loads equal to or greater than 2000 kg), the conveyor belt solution is no longer feasible. For extremely heavy loads (such as loads greater than 5000 kg), an external hoisting platform can be used that is moved beneath the rear cargo door of the aircraft and is then hoisted up to the ground level of the cargo bay of the aircraft. However, such a hoisting platform is cumbersome and expensive to use and is also over-dimensioned for intermediate weight loads (e.g., between 2000 kg and 5000 kg).

For those intermediate weight loads, cranes are used, sometimes external cranes or also internal cranes mounted to the cargo bay of the aircraft. The main problem with external cranes is, again, their cumbersome and expensive usage, while internal cranes are more favorable in this respect. However, internal cranes are subject to numerous constraints, such as requirements by law for permitting the crane, and also constraints pertaining to opening/closing the rear cargo door of the aircraft.

Thus, there is a need for an easy-to-use, inexpensive and simply mountable crane system for use in an aircraft.

Accordingly, there is a need for an implementation of a scheme that avoids one or more of the problems discussed above, or other related problems.

SUMMARY OF THE INVENTION

There is provided a mono-rail crane system for use in an aircraft, the crane system enabling the transfer of a load from outside the aircraft into the aircraft and vice versa, and comprising a first longitudinal mono-rail installable on the underside of a rear cargo door of the airplane parallel to the longitudinal axis of the rear cargo door; a second longitudinal mono-rail, which is installable on a cargo hold ceiling of the aircraft, and, in the fully opened state of the rear cargo door, in aligned continuity with the first longitudinal mono-rail so that the longitudinal axes of the first and second longitudinal mono-rails coincide to form one common longitudinal axis; a crane mobile equipment, CME, configured to be movable along the first and second longitudinal mono-rails in order to hoist and transfer the load; and a linear actuator configured to advance and retreat the second longitudinal monorail towards and away from the first longitudinal monorail. Such a system enables crane stowage so as not to protrude into the cargo hold envelope and will not interfere with opening/closing the rear cargo door.

In the fully opened state of the rear cargo door, the common longitudinal axis may be under a predetermined angle in relation to a horizontal plane of the aircraft, the horizontal plane containing the center line of the fuselage of the airplane. In this case, the predetermined angle may be 3.5° and may have a tolerance of +/−2.0°. Still further, the load may have weight of up to 5000 kg. In this way, intermediate weight loads can be handled efficiently.

The first longitudinal mono-rail may comprise a plurality of tracks, each track being mounted on slide brackets, which slide brackets are attached to interface fittings to be received in interface holes in the rear cargo door. Thus, the second longitudinal mono-rail can be simply affixed to the outside/underside of the rear cargo door.

The CME may be, during flight mode, secured in a stowage position at the proximal end of the second longitudinal monorail, and, during operational mode, able to move between the stowage position and the distal end of the first longitudinal mono-rail. If so, the first and second longitudinal mono-rails may each comprise a rolling surface for the CME. In the latter case, the rolling surfaces may be one of substantially flat and formed in the form of a toothed rack so as to engage with the CME. In addition or alternatively, the CME may further comprise a wheel mechanism so as to compensate for a displacement between the tracks and a further displacement at the transition between the first and second longitudinal mono-rails. In this way, the CME is implemented efficiently.

The CME may further comprise an attaching device configured to physically displace an arresting point between the CME and the load. Thus, lateral forces and torque/torsion transmitted to the rail are minimized.

The crane system may further comprise a cargo hold rail assembly above the second longitudinal mono-rail configured to structurally support the second longitudinal mono-rail. If so, the linear actuator may form a part of the cargo hold rail assembly and may be configured to act as an additional rod of the assembly. In addition, the cargo hold rail assembly may be installable on the cargo hold ceiling above the rear ramp area of the airplane. Thus, the crane system is simply mountable.

The most proximal slide bracket of the first longitudinal mono-rail may be configured as a female locator housing, and a most distal bracket of the second longitudinal mono-rail may be configured as a male alignment device so as to establish the aligned continuity between the first and second longitudinal upon advancing movement of the linear actuator. In this way, when establishing the operation mode of the crane system, the system is easy-to-use.

Further, there is provided a method of operating a mono-rail crane system for use in an aircraft, the crane system enabling the transfer of a load from outside the aircraft into the aircraft and vice versa, wherein the crane system comprises a first longitudinal mono-rail installable on the underside of a rear cargo door of the airplane parallel to the longitudinal axis of the rear cargo door, a second longitudinal mono-rail, which is installable on a cargo hold ceiling of the aircraft, and, in the fully opened state of the rear cargo door, in aligned continuity with the first longitudinal mono-rail so that the longitudinal axes of the first and second longitudinal mono-rails coincide to form one common longitudinal axis, a crane mobile equipment, CME, configured to be movable along the first and second longitudinal mono-rails in order to hoist and transfer the load, and a linear actuator configured to advance and retreat the second longitudinal monorail towards and away from the first longitudinal monorail, the method comprising the steps of, during flight mode, securing the CME at the proximal end of the second longitudinal mono-rail in a stowage position; during flight mode, retreating the second longitudinal mono-rail so as to allow closing the rear cargo door; during operation mode, advancing the second longitudinal mono-rail so as to establish the common longitudinal axis; and during operation mode, releasing the CME so as to be movable between the stowage position and a distal end of the first longitudinal mono-rail.

Still further, it is to be noted that the method aspects may also be embodied on the mono-rail crane system described above comprising at least one processor and/or appropriate means so as to implement the control-related aspects.

BRIEF DESCRIPTION OF THE DRAWINGS

The embodiments of the technique presented herein are described herein below with reference to the accompanying drawings, in which:

FIG. 1A shows an example arrangement of the crane system according to the present disclosure during flight mode;

FIG. 1B shows an example arrangement of the crane system according to the present disclosure during operation mode;

FIG. 1C shows a scheme of the crane components involved during operation mode;

FIG. 1D shows a schematic perspective view of the crane system;

FIG. 2A shows a perspective view of a cargo hold rail assembly;

FIG. 2B shows a perspective view of a cargo door rail assembly;

FIG. 3A shows a detailed view of the CME equipment;

FIG. 5 shows a mechanical architecture of the crane components involved;

FIG. 6B shows a schematic view of the electrical architecture underlying the crane system of the present disclosure;

FIG. 8A shows a further perspective overview of the cargo hold rail structure assembly;

FIG. 8C shows an overview of the cargo door rails;

FIG. 8E shows details of the cargo door rail;

FIG. 8F shows details of the cargo door rail;

FIG. 10D shows a case when the CME unable to be safely stowed due to interference visual indication, and a case when the CME stowage device properly latched and the CME can be properly stowed;

FIG. 11B shows a speed profiling in relation to FIG. 11A;

FIG. 12 shows a perspective view of the festoon cable assembly and rounds;

FIG. 13A shows a side view of a disconnected/connected state of a rail actuator;

FIG. 14 shows a method embodiment which also reflects the interaction between the components of the device embodiment.

DETAILED DESCRIPTION OF THE PREFERRED EMBODIMENTS

Figure 1E:
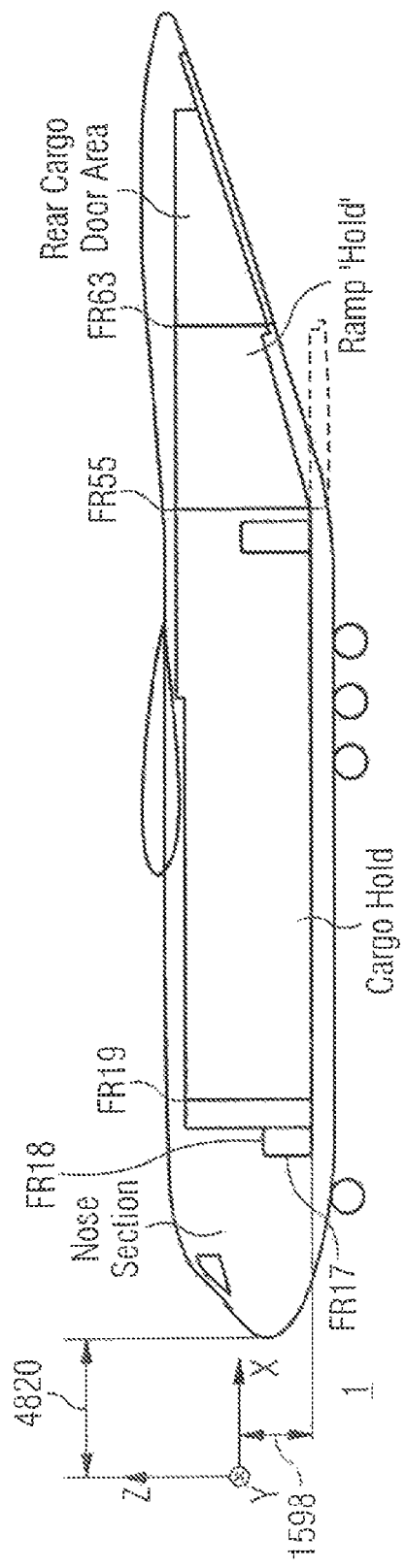
FIG. 1E shows a frame plan of the aircraft.

In the following description, for purposes of explanation and not limitation, specific details are set forth (such as particular signaling steps) in order to provide a thorough understanding of the technique presented herein. It will be apparent to one skilled in the art that the present technique may be practiced in other embodiments that depart from these specific details.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

1. General 1.1 Objectives

The present disclosure describes the design and implementation of a mono-rail crane system 10 of the A400M aircraft (as an embodiment of the general aircraft). Further, the present disclosure describes the architecture of the system and identifies the components that make up the system. The content includes:

Description of the system.

Identification of the interactions between each system component.

Description of the operation and the behavior of the system.

Note: The drawings in this disclosure are for understanding purposes only and may not represent the design solution particularly in its scale.

Note: Unless otherwise stated, the figures are for orientation purposes only.

1.2 Applicability

The present disclosure is applicable to an aircraft (such as the A400M aircraft) equipped with the crane system of the present disclosure.

1.3 Equipment Covered by this Disclosure

As is shown in FIGS. 1A to 1E, the mono-rail crane system 10 is comprised of the following main components:

A first longitudinal rail 100 installed on the underside of the rear cargo door D.

A second longitudinal rail 200 in continuity with the rail 100 on the underside of the rear cargo door, to be installed on the cargo hold ceiling (preferably above the rear ramp area). Preferably, such a rail shall enable crane stowage so as not to protrude into the cargo hold envelope.

This inner rail assembly includes also an actuated device 400 to configure the demanded position of the rail 200.

A crane mobile equipment (CME) 300 to enable hoisting and transfer of loads L.

In addition, the following devices are preferably used for the control of the crane 10 and for the control of the connection of the rails 100, 200, respectively:

A hand held remote control (Remote Control Unit). This may be part of the Load Master Control System.

A control panel to operate and control movement of the inner rail 200 to the outer rail 100 (Rails Actuator 400 Control Panel).

2. Glossary 2.1 List of Abbreviations

ABD Airbus Directives and Procedures
AFT Aft Wards
AIM Airbus Military
AM Airbus Methods and Tools
AP Airbus Procedures
ATA Air Transport Association of America
BITE Built-In Test Equipment
CCS Cargo Crane System
CHS Cargo Handling System
CME Crane Mobile Equipment
CMS Central Maintenance System
COTS Commercial Off The Shelf
CRI Certification Review Item
CS EASA Certification Specification
CSA Common Standard Aircraft
DAL Development Assurance Level
DC Direct Current
DDP Declaration of Design and Performance
DRL Document Requirement List
EADS-CASA European Aeronautic Defense and Space company—Construcciones Aeronáuticas
ECU Electronic Controller Unit
EPES Extraction Parachute Ejector System
FHA Functional Hazard Analysis
FIN Functional Item Number
FWD Forward
GRS Guide and Restraint System
GSE Ground Support Equipment
HAZ/CAT Hazardous/Catastrophic
HMI Human Machine Interface
IFA Integrated Fuselage Assembly
JAR Joint Aviation Requirements
LH Left Hand, ref. RH
LMC Load Master Control
LMCP Load Master Control Panel
LMWS Loadmaster Workstation
LRU Line Replaceable Unit
MCRI Military Certification Review Item
N/A Non-Applicable
NVG Night Vision Goggles
OI Operational Interrupt
OPM Operational Manual
PEPDC Primary Electrical Power Distribution Center
PTS Purchaser Technical Specification
RA Reliability Analysis
RACP Rails Actuation Control Panel
RCCB Remote Control Circuit Breaker
RCU Remote Control Unit
RF Reserve Factor
RH Right Hand, ref. LH
SCN Specification Change Notice
SDD System Description Document
SEPDC Secondary Electrical Power Distribution Center
SES Supplier Equipment Specification
SRD System Requirement Document
SSA System Safety Assessment
SRU Shop Replace Unit
SWLP Sidewall Lock Panel
TBC To be confirmed
TBD To be defined
ULD Unit Load Device
VAC Volts of Alternating Current
VDC Volts of Direct Current
WBR Weight & Balance Report
WF Wild Frequency
WOW Weight on Wheels 3. System Design Rationale The crane system 10 is designed to be capable of lifting loads of up to 5,000 kg from the ground, a truck or transport device onto the ramp. The system 10 preferably enables hoisting and the transfer of military pallets (of up to 96 inches (=2.4384 m) in height) and bulk loads from truck bed heights up to 1.7 m, aligned to or perpendicular to the center line of the fuselage, onto the ramp or to the toes.

There is an interaction between the crane, and cargo handling system functions supported by the LMC: the load/unload capability of cargo loads by means of hoisting, operated from LMC controls.

The main drivers for the crane development preferably are:
Aircraft interfaces
Aircraft envelopes
Loads generated
Ground operation
Total weight of the system
Safety and reliability
Tolerances
Power consumption
Maintainability
Mission Availability
Useful Life 3.1 General Design Philosophies The following main concepts are preferably applied to the design of the crane 10:
Safe and Easy operation
Manual back-ups
Duplicated controls
Emergency stop capability
Integrated announcement on LMWS
Integrated BITE hosted on LMC The design criteria of the basis for the theory of operation are common principles of industrial hoist devices, but with the considerations of a different and new application on an aircraft, and the different implications derived from the aircraft integration, as the single rail concept or the environmental resistance.

3.1.1 Safety Considerations

The evaluation of potential failures of the system functions is considered to implement solutions that eliminate conditions that could impact on operational safety.

According to the context of the crane 10, the following approach is preferably considered:
Functionally certified as a system.
The fix structure (rail assemblies): will be designed according to the structural safe considerations criteria.
The FHA will define the DAL allocation of the system.

3.2 Conditions at the Airplane (A400M) and Location

The frame plan of the airplane 1 (embodied as an A400M) is given in FIG. 1E.

The installation of the crane system 10 is preferably focused on the rear part of the aircraft/airplane 1, that is, in ramp hold and cargo door D, along the aircraft center x-datum, allowing the longitudinal movement of the mobile parts as is shown in FIG. 1D.

3.2.1 Cargo Hold Rail Assembly

The cargo hold rail 200 assembly preferably is the structural part which is one of the two assemblies which are responsible for the supporting function of the crane system 10.

The cargo hold rail 200 assembly is installed between FR60 (frame 60) and FR63 (frame 63) to be explained herein below. The overview can be seen in FIG. 2A.

3.2.2 Cargo Door Rail Assembly

As shown in FIG. 2B, the cargo door rail 100 preferably is an installed rail assembly located in the underside of the cargo door D, e.g., from frame 63 to frame 72 to be described herein below. The external rail 10 is preferably divided into four (4) tracks (this does not preclude a different number of tracks).

Each track is preferably mounted on slide brackets, which are attached to the interface fittings. These interface fittings are preferably attached to the cargo door D in already existing IF holes.

3.2.3 Crane Mobile Equipment

As shown in FIG. 3A, the Crane Mobile Equipment, CME, 300 is preferably located in the Rear Fuselage Area. During operation, the CME 300 preferably has the capability to move along the complete rail assemblies 100, 200, from FR60 up to FR72 (frame 72) to be explained herein below.

For flight mode, the CME 300 preferably has means to be blocked at the end of crane rail cargo hold (as an example of the mono-rail 200) which is the stowage position (between FR60 and FR63). In this stowage position, the CME 300 is not allowed to move or to perform any operation or command.

For operation mode, the CME 300 is preferably unblocked from its stowage position and it is able to move from its stowage position to the rear end of the cargo door rail 100, when both rails 100, 200 are connected. When the equipment is in this operation mode, it can move from FR60 to FR72 approximately.

3.2.4 CME Interconnection Wiring Assembly

Figure 3B:
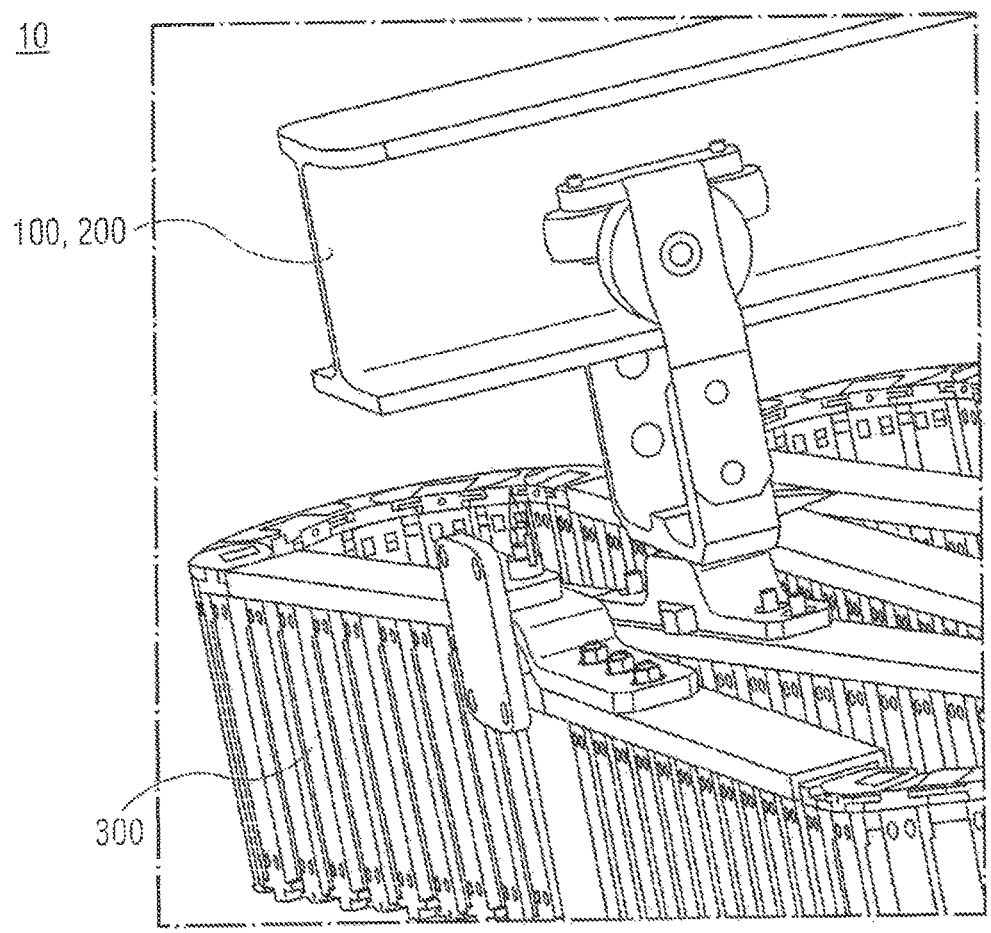
FIG. 3B shows a CME festoon and its interconnection wiring assembly.

As shown in FIG. 3B, a festoon cable and its support structure in stowage position are preferably located attached to the cargo hold rail 200, between frame 59 and frame 60 approximately.

In operation mode, the wiring preferably transmits the commands from LMWS/RCU/RACP to the CME 300, enabling it to travel from its stowage position to the rear part of the cargo door rail.

3.2.5 Rail Actuator

Figure 4:
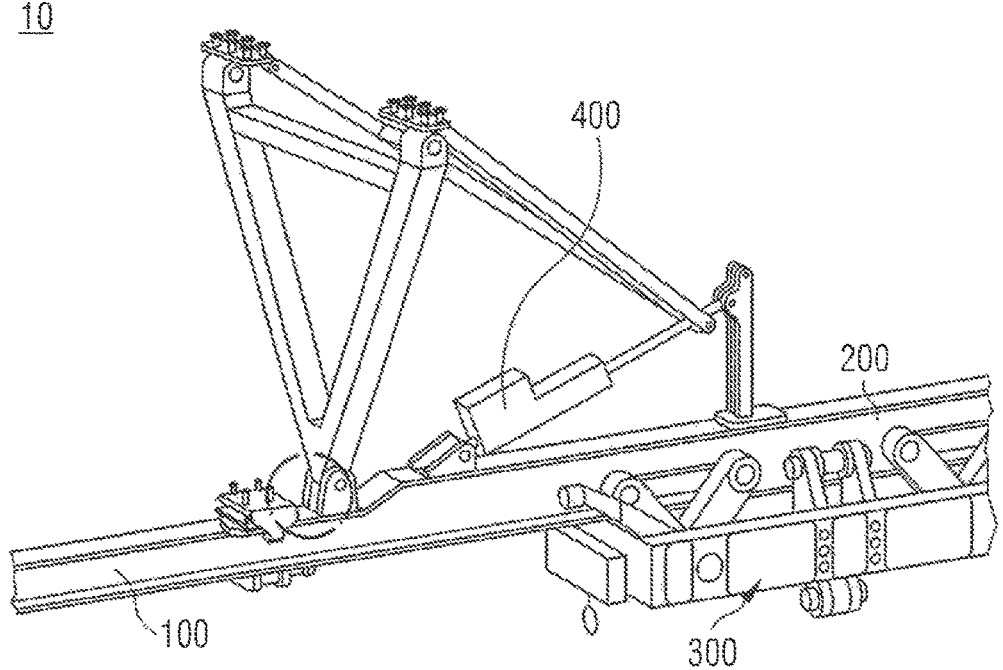
FIG. 4 shows a perspective view of a rail actuator and proximity switches.

As shown in FIG. 4, the (linear) rail actuator 400, once installed, preferably is a part of the cargo hold rail assembly, acting as an additional rod of the structure. The rail actuator 400 is preferably located close to the attachments of the rear part of the cargo door rail between FR62 and FR63 approximately.

The commands of the rail actuator 400 are preferably sent to the actuator 400 and the CME 300 after the proximity sensors have been taken into account for actuator operation logics. Their goal is to assure proper connection between rails being located at the rear end of the cargo hold rail 200 (preferably interfacing with the sensing limits installed at the door rail when connecting rails).

A RACP (Rails Actuator Control Panel) is preferably located below the SWLP in the ramp area, LH of the aircraft 1, between frames FR59 and FR60. The wiring associated with the actuator and with the panel is preferably installed between the ceiling area and the left side fuselage, frames 59-63.

3.2.6 Load Master Control Panel & Remote Control Units (Part of LMC System)

The Crane control panel is preferably included in the LMCP, which is located in the rear part of the cargo hold on the LH side aft of the paratroop door.

The two RCUs are preferably equipped with flexible cable of adequate length, and they are also used for other cargo handling purposes. Six connection plugs are preferably distributed within the cargo hold in order to use the RCUs at various locations (4 on the left-hand side, 2 on the right-hand side).

4. System Definition

The subchapters of this section describe the solution chosen according to the Design Philosophy stated in section 3 and the high-level requirements.

The following information is expanded within this section:

The description of the System Architecture.

The allocation of functions to equipment/items (circuitry, standard items . . . ) of the system The general characteristics of Equipment.

A general description of Operation/Control and Indicating.

The System provisions.

The Design precautions in case of specific environmental conditions.

The Installation Concept.

The Interface requirements for the other Systems or Structure.

Any useful additional Definition Information.

4.1 System Architecture:

The mechanical architecture is as shown in FIG. 5.

The system is divided into two major assemblies that interface with different parts of the aircraft 1: the inner rail assembly 200 and the outer rail assembly 100.

The inner rail assembly 200 is the structure attached to the Cargo Hold frames 60 and 63, and it is permanently stowed during flight. This stowage is reverted when the CCS is required to operate, as explained below.

The outer rail assembly 100 is the structure attached to the underpart of the cargo door D. It is preferably composed by a set of tracks (e.g., x4) that are linked between them in order to enable thermal effects to occur without having impact on the installation of the crane system 10. These tracks are preferably supported by the mounting brackets, (e.g., x5), which have capacity to withstand forces in the "Y" and "Z" axis. Preferably, only the AFT mounting bracket has the capability to withstand forces in the "X" (longitudinal) direction.

The actuator 400 is the part of the system responsible for the configuration of the rail assemblies 100, 200. During flight, it is preferably retracted in order to enable movement of the cargo door D and aerial delivery operations to be performed. When on ground, with the crane system 10 being operative, the actuator 400 is preferably extended to enable the rails assemblies (inner 200 and outer 200) to link (i.e., alignment performed by the alignment device and the locator).

Figure 6A:
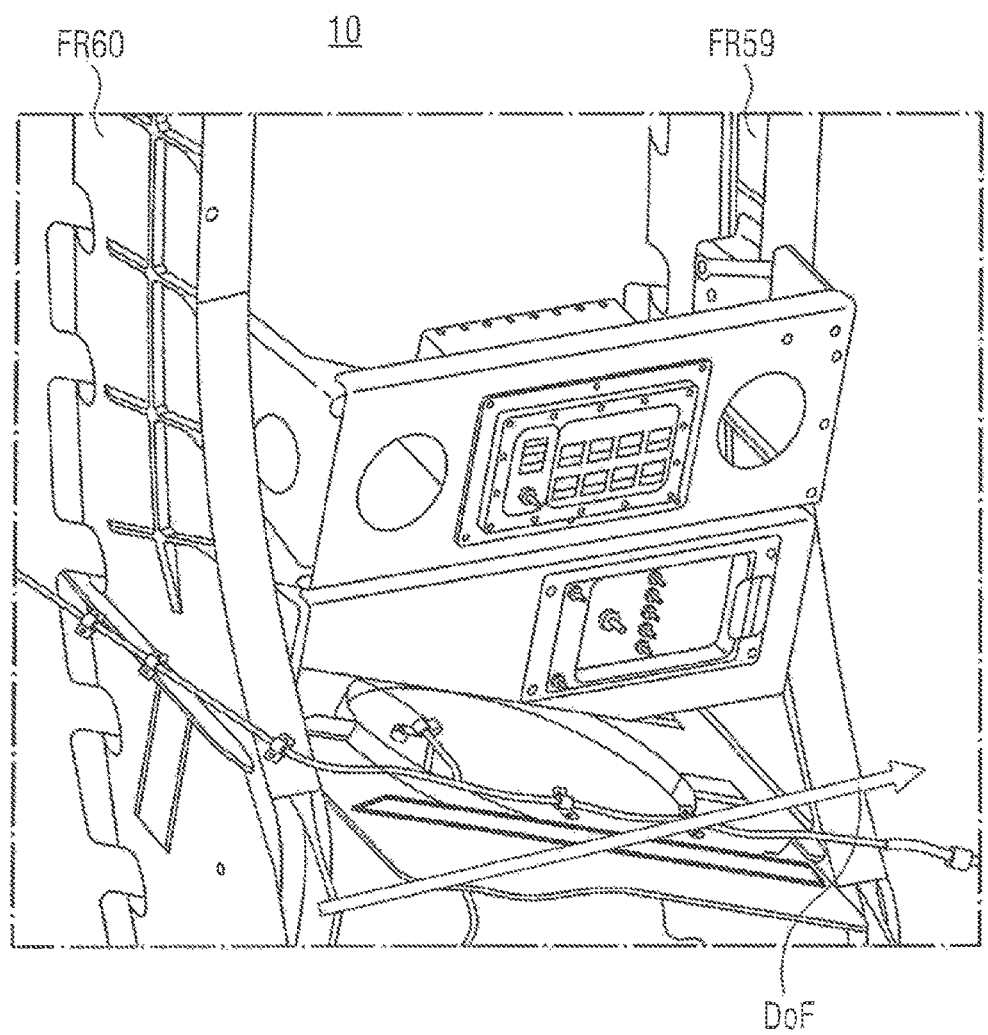
FIG. 6A shows a perspective view of a rails actuation control panel location in the aircraft.

Further, as shown in FIG. 6A, the Rails Actuation Control Panel is preferably located between FR59 and FR60, LH of the aircraft 1. The panel is responsible for commanding the actuator 400.

Still further, the electrical overall architecture is as shown in FIG. 6B. The aircraft 1 supplies the CCS preferably with 3 types of electrics:

AC power supply,
DC supply, and
Control discretes.

Additionally, the DC power is preferably also used for control purposes (actuator power control logics, implemented at system level).

The main source of power preferably is the aircraft generating & distribution system from PEPDC and SEPDC and through the associated RCCB's. The main source of control signals preferably is the LMWS, which hosts the hierarchy of command (both LMCP and RCU can command the CME).

The CCS preferably also feeds the LMWS with failure signals that, when launched, trigger different alerts and indications at LMWS level. This alert/indication logics is preferably also hosted in the LMWS.

The CCS preferably is a BITE contributor and therefore the BITE shall be defined with the above shown signals.

4.2 Allocation of Functional Requirements

Figure 7:
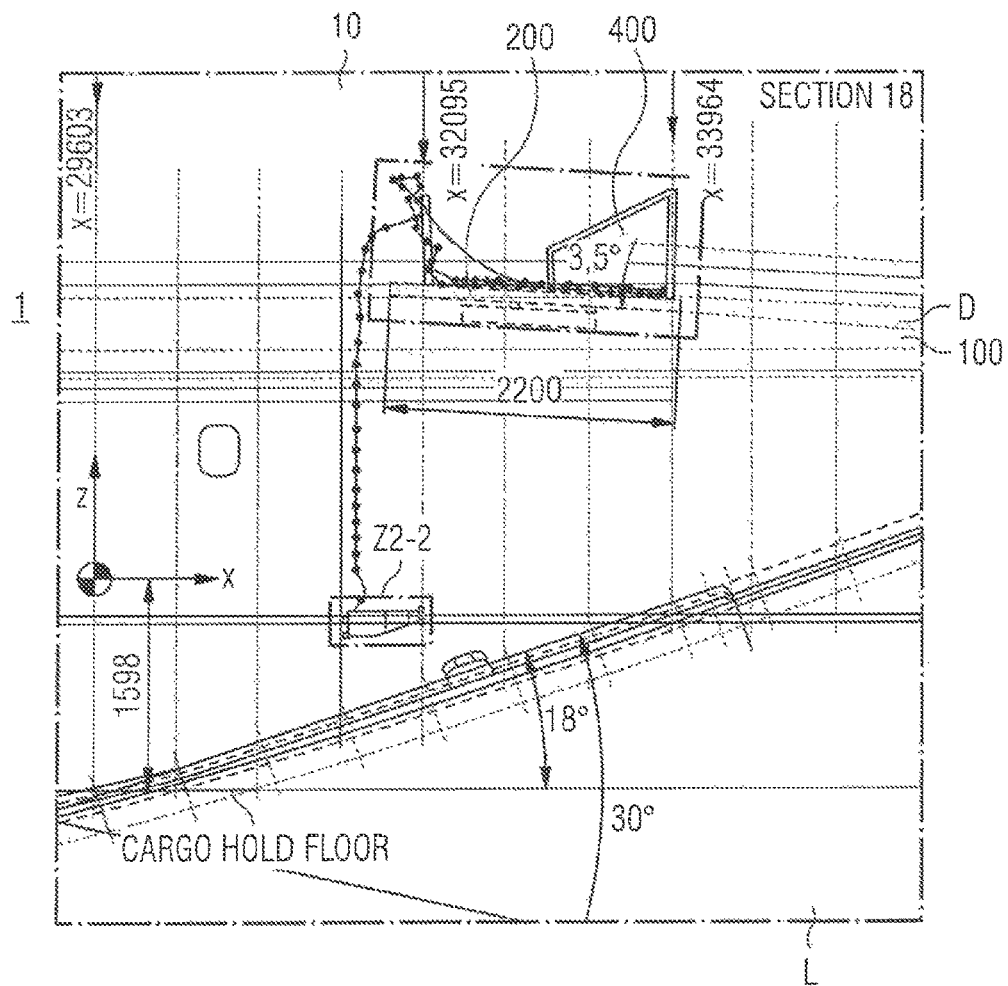
FIG. 7 shows an overview of the crane inner rails.

The requirements of the crane system 10 can be divided into the following categories:

Operational Requirements
Interface Requirements
Physical Requirements (mounting, size, power, weight)
Environmental and electromagnetic interference (EMI) requirements
Safety and Reliability Requirements
Testability and Maintenance requirements The allocation of the functional requirements to the different parts of the system is provided in the SRD:

Cargo hold rail 200 structure:
CME stowage
rolling surface and guiding for the in/out movement of the CME 300
Cargo door rail 100 structure:
rolling surface and guiding for the in/out movement of the CME 300
Crane Mobile Equipment 300:
Hoist for lifting/lowering (up to 5 tons), and trolley vehicle for in/out movement (including manual backup)
Includes electronic controller, load limiter, load sensor, brakes, stroke limiters and stowage lockers.
Interface for manual backup operation
Fleet angle sensing & indication
Festoon cable assembly:
Transport of power and commands interfaces
Actuator for rails connection:
Connect both rails when cargo door is open
Control panel/s
Transmit power and control commands to the equipment.
Human-Machine Interface 4.3 General Characteristics of Equipment 4.3.1 Cargo Hold Rail Assembly As shown in FIG. 7, the cargo hold rail 200 assembly is preferably composed by two subtypes of components, according to its functionality:

Above the rail 200, there preferably are elements which are used for structural supporting of the system (Structural load paths, actuator for rails configuration, alignment devices, etc.) and also for supporting of the electrical elements which will be installed (harnesses, sensors, etc.).

In the rail 200 itself, elements whose goal is to enable CME 300 functionalities (e.g., lower flange for CME movement, etc.). One exception to this is on the alignment devices. This alignment device part is preferably located below the rail and has the goal of configuring the two rails to have a proper operation.

Once the cargo door D is configured in the upright position, the rails preferably are configured by means of the rails actuator 400 (see following chapters).

The logics for activation of the crane system 10, power supply and cargo hold rail configuration are allocated in the LMWS. These logics consider several parameters prior to CCS activation, such as:

WOW/Weight on Wheels
Cargo door opened
LMWS powered

Further, the rails 100, 200 are preferably configured into operational/stowage positions by means of the rails actuator 400, which is addressed in further chapters.

The cargo hold rail 200 preferably allows the longitudinal movement of the CME 300 by means of the wheels installed on the CME 300.

The cargo hold rail 200 Assembly provides preferably supports to maintain the CME 300 in stowed position when the CME is not being used and always for flight conditions. The assembly is preferably composed by the inner rail 200, the structural supporting components and their attachments to the aircraft 1 interfaces. This cargo hold rail assembly preferably is configured (by being moved FWD or AFT) for operation or flight. This configuration is preferably performed by means of the actuator extension and retraction respectively.

Figure 8B:
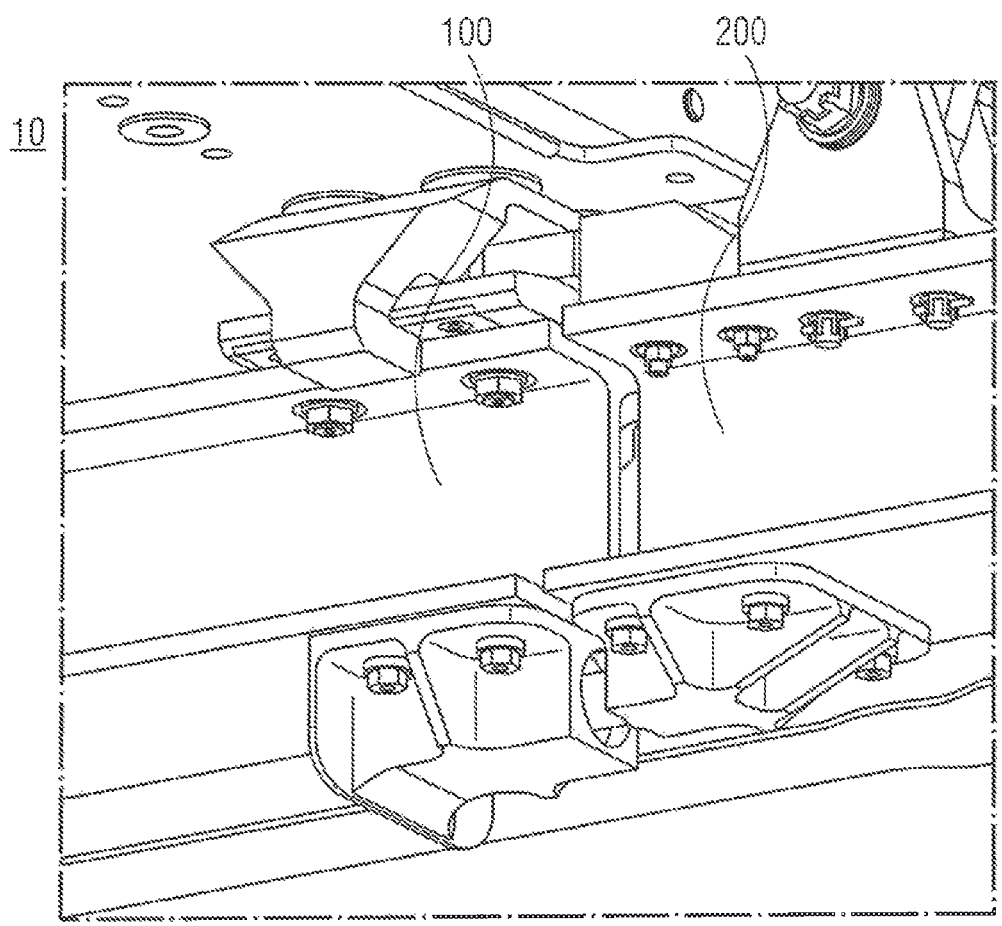
FIG. 8B shows a perspective view of a detail of a rails connection adaptor.

As shown in FIG. 8B, the cargo hold rail 200 assembly preferably has a locator device male pin to ensure alignment between both rails during operation. As shown in FIG. 8A, the structure of cargo hold rail 200 assembly preferably includes:

cargo hold rail 200
FWD Mechanical Stopper/s and Lock devices
Frame 60 and Frame 63 Support Structure
Rails Connection Adapter/Mechanism (provisions to install the Rail Connection Actuator)

As further shown in FIG. 8B, the cargo hold rail 200 and the Cargo Door Rail 100 are preferably connected by means of a junction device that allows the transition of the CME between the two rails.

4.3.2 Cargo Door Rail Assembly

As shown in FIG. 8C, the cargo door rail 100 assembly is responsible for transfer of loads L from equipment to aircraft 1. The rail 100 is preferably permanently attached to the cargo door D. At the AFT end of the rail 100, there are preferably two bumpers (one on each side) whose mission is to disable further movement of the CME 300.

Figure 8D:
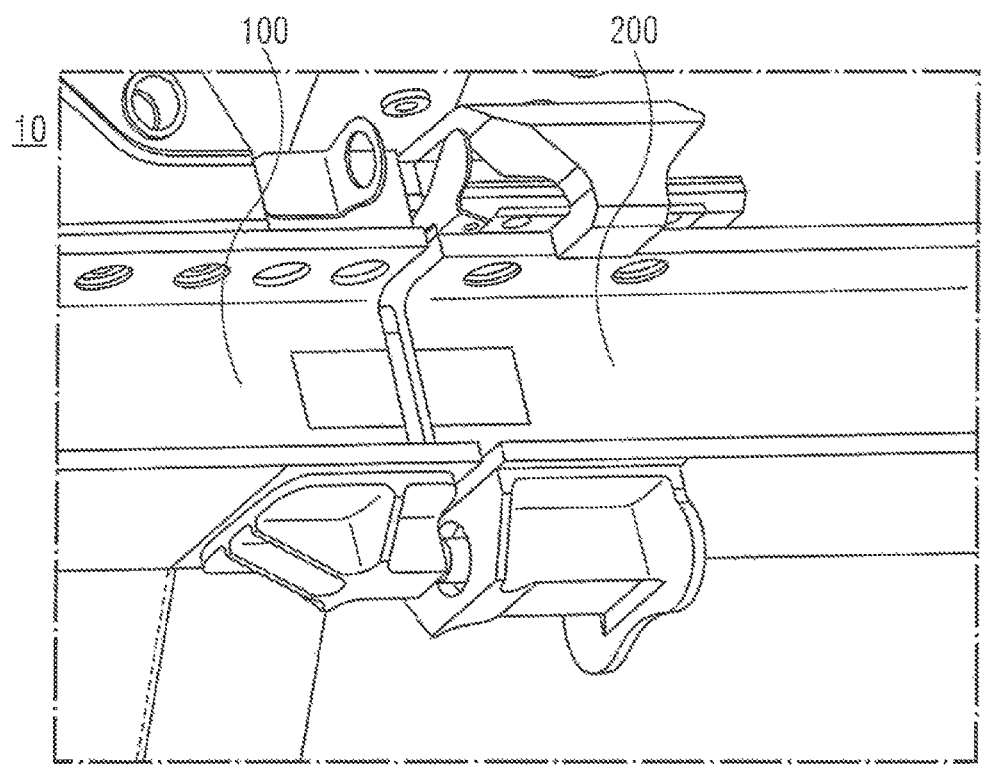
FIG. 8D shows a perspective view of the location housing of FIG. 8B in a connected state.
Figure 9:
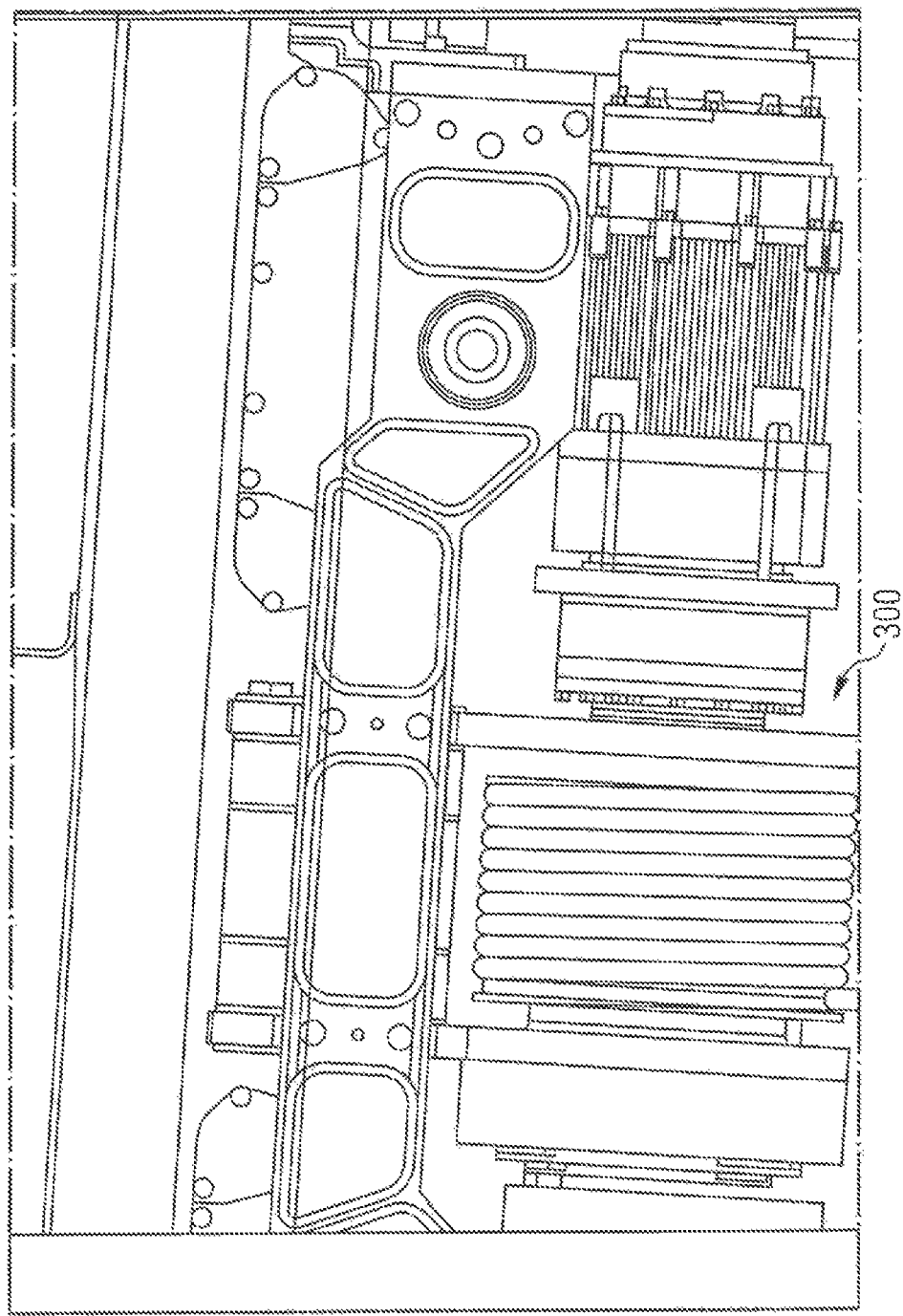
FIG. 9 shows the rail AFT geometry (at the end of the cargo door rails) in the aerial delivery area.

As shown in FIG. 8D, the cargo door rail 100 assembly preferably has also a locator housing (female, located in the FWD end side) which is acting as a guidance for the male alignment device (located in the lower flange of the cargo hold rail 200) AFT movement during configuration for operation. The cargo door rail 100 assembly preferably has structural purposes only. There preferably are no harnesses or cables mounted on this cargo door rail 100 assembly.

As shown in FIGS. 8E and 8F, the cargo door rail 100 allows the longitudinal movement of the CME 300. This cargo door rail 100 preferably supports the CME 300 during the operation to ensure the functions of hoisting, lowering and transfer of loads. The cargo door rail 100 is split preferably in four parts and installed on the underside of the cargo door D by means of e.g., 5 attachment points.

The structure of the cargo door rail 100 assembly preferably includes:
cargo door rails (4 parts)
Interface (I/F) Brackets
Middle Slide Brackets, FWD Slide bracket & RWD Slide Bracket
RWD CME Stopper/s
Lower Locator Housing 4.3.3 Crane Mobile Equipment 300

4.3.3.1 General Overview

As shown in FIG. 1D, the crane mobile equipment 300 ensures the functions of hoisting, lowering and transfer of loads L. The CME 300 preferably moves along the rails in aircraft x-direction.

The CME 300 preferably includes:
Equipment structure and wheel interfaces with rail 100, 200.
Motors
Gearings
Brakes
Control module
Cable
Sensors (position, load, etc.)
Overload protection
Two Stowage Devices
Weight display integrated in the Electronic Control Unit (ECU)
Hook Stowage Device
Hoist actuator After operation, the unit is preferably stowed at the cargo hold rail 200 and secured with two independent mechanical devices to the rail to prevent any movement during flight. Each one of these two devices, which are equal one to another, preferably has the capability of maintaining the CME 300 position during flight mode. When the operator wants to start CME operation, then these stowage devices shall be manually disconnected.

Figure 10A:
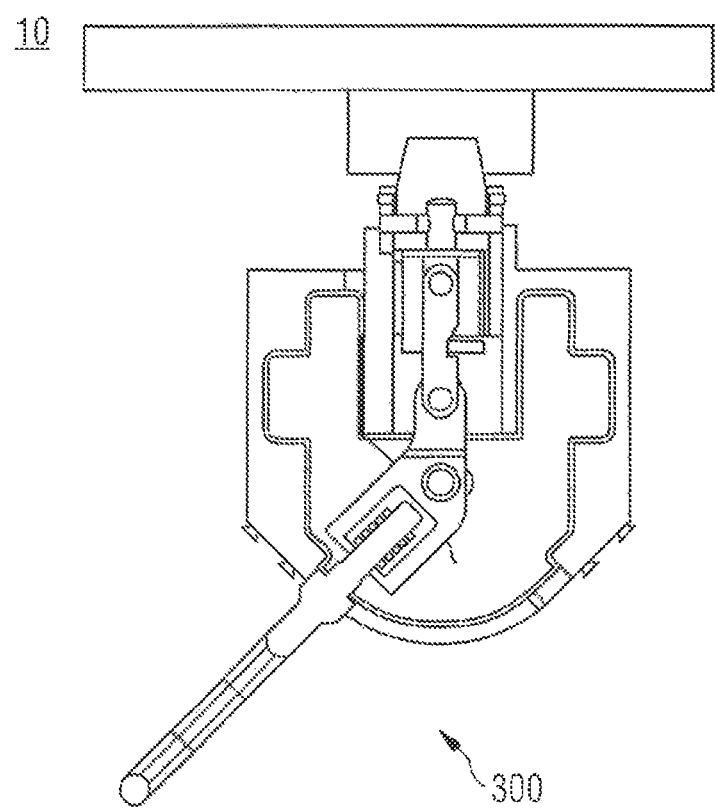
FIG. 10A shows a CME stow mechanism.

As is shown in FIG. 10A, the hook is preferably also protected from any movement with a mechanical stowage device. The crane mobile equipment is preferably electrically driven to perform hoisting, lowering and transferring of loads.

The CME 300 preferably has also a mechanical backup to enable the operator to perform a manual operation (for hoisting, lowering and travelling), with a crank from the aircraft EPES system (EPES crank is part of the CSA), in case of electrical power loss/failure.

Further, the CME 300 preferably incorporates wheel mechanisms (e.g., buggy trains x2, wheels x4 mounted on each bogey) to cope with the displacement of the equipment along both rails 100, 200. Also, the wheel mechanism preferably provides a smooth transition while passing through the x-gap between both rails.

Additionally, a set of lateral rollers preferably supports the lateral load and provides an alignment along the longitudinal axis of the aircraft restraining z-axis moment of the CME 300. There preferably are four lateral rollers supports with the same number of rollers located in the main bogie support to assure its lateral stability. The lateral wheels preferably support the resultant dynamic lateral forces from the cable-hook lateral movement, with a maximum of 10° inclination and the lateral friction forces.

The equipment preferably has features for load transfer to control position and speed. This position and speed are preferably controlled via the ECU of the CME (HW and SW control).

Further, a weight display is preferably installed in the CME at 33° (±3°) approximately in order to show to the load master LM the actual weight of the load L thus avoiding any overweight in the equipment.

In addition, the CME 300 preferably has features for load lifting including a power brake, speed limitation and stroke limitation:

The power brake is normally activated unless there is a hoist command (either UP or DOWN).

The speed limitation is performed via the CME ECU (SW control).

Then stroke limitation is performed via end stops.

The components for hoist function preferably include at a minimum the drum drive, cable drum assembly and hook attached to the cable end. The hook latch is preferably unlatched or released by the operator.

Moreover, an overload protection mechanism is preferably included by means of a set of electronic weight sensors providing weight measurement to the Control Unit. This weight is also displayed in the ECU weight display.

Figure 10B:
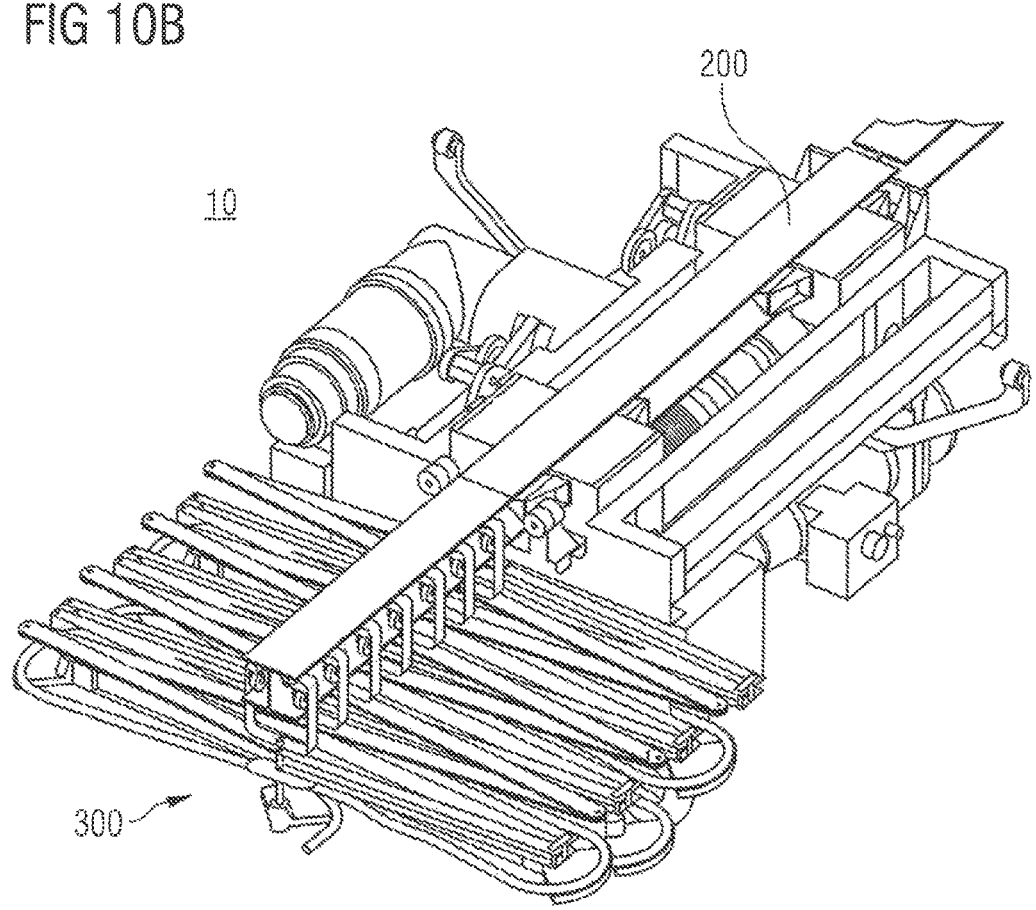
FIG. 10B shows another perspective view of the CME and its festoon.

As shown in FIG. 10B, a controller of the logic of operation and a power supply module for power conversion and rectification is preferably also part of the equipment. The CME 300 preferably performs power conversion to accommodate e.g. a 115 VAC WF three-phase power supply into a 270 VDC power supply for the motors. The electrical controller preferably implements the necessary logics for the control of the crane 10. The logics of operation are preferably implemented according to the commands transmitted from the LMC. A +28 VDC command input is preferably also provided from the RACP to the CME to enable control logics and ECU power supply.

The CME 300 preferably has means to minimize lateral forces and torque transmitted to the rail. This is achieved by designing an attaching device which is able to move in the Y-direction. This device preferably physically displaces the arresting point between the CME 300 and the pallet, aligning the pallet lifting force line and the torsion center of the beam, minimizing the distance between them and therefore the torsion moment.

Moreover, the CME 300 preferably is able to withstand loads L at a maximum lateral fleet angle of 13.6°. There will be sensors to make the CME aware of the cable position. Dedicated sensors will be installed to detect whether the cable is approaching the maximum fleet angle or whether the cable has exceeded this fleet angle.

The CME 300 preferably embeds SW to perform logics of control. The functions that this SW shall perform preferably are:

1. To control the CME 300 in accordance with the inputs from LMC.

2. To combine the logics of each input signals regarding the different operational needs:
a. Fleet angle caution
b. Fleet angle warning
c. CME reaching end stops
d. Accelerations and speeds control when starting the movement(s)

The SW of the CME is preferably only operated on ground.

4.3.3.2 Stowage Function

The CME 300 preferably is to be sufficiently blocked during flight mode so as to ensure proper, safe operation of the CSA. For this purpose, two independent stowage devices preferably are located in the underside part of the cargo hold rail 200 (e.g., below the lower flange). These two devices located below the rail Inner Rail Structure belong to the inner rail 200 structure and act as female housings for male structural pins to be interlocked from the CME 300.

For this stowage position, the CME 300 preferably has the two correspondent male pins whose goal is to ensure total restriction of movement while the CME is in flight or in any other mode which is not the operative mode.

Figure 10C:
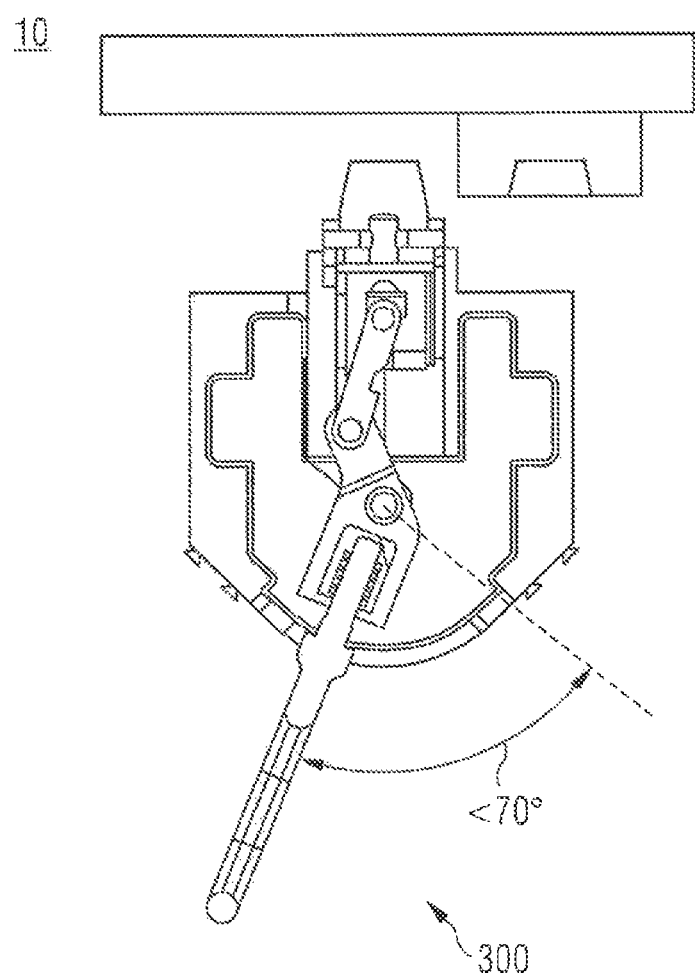
FIG. 10C shows a case when the CME is not properly latched for stowage.

As shown in FIGS. 10C and 10D, these two devices preferably are similar one to another, but totally independent and also composed by structural elements. No electronics needs to be allocated in this function. Further, the two devices need visual confirmation of positive locking of the male pin into the female device which it is matching. The detection means of the CME will be visual. For this purpose, the detection means will only be indicating the proper attitude when the stowage device is properly inserted into its applicable housing.

The stowage devices preferably are also actuated by means of the EPES crank.

4.3.3.3 Hoisting (Lifting) Function

The lifting function is preferably performed by means of:
CME Electronic Control Unit
Hoist actuator
Structural elements to derive the forces generated during lifting phase structural to the Rail Assembly.

Figure 11A:
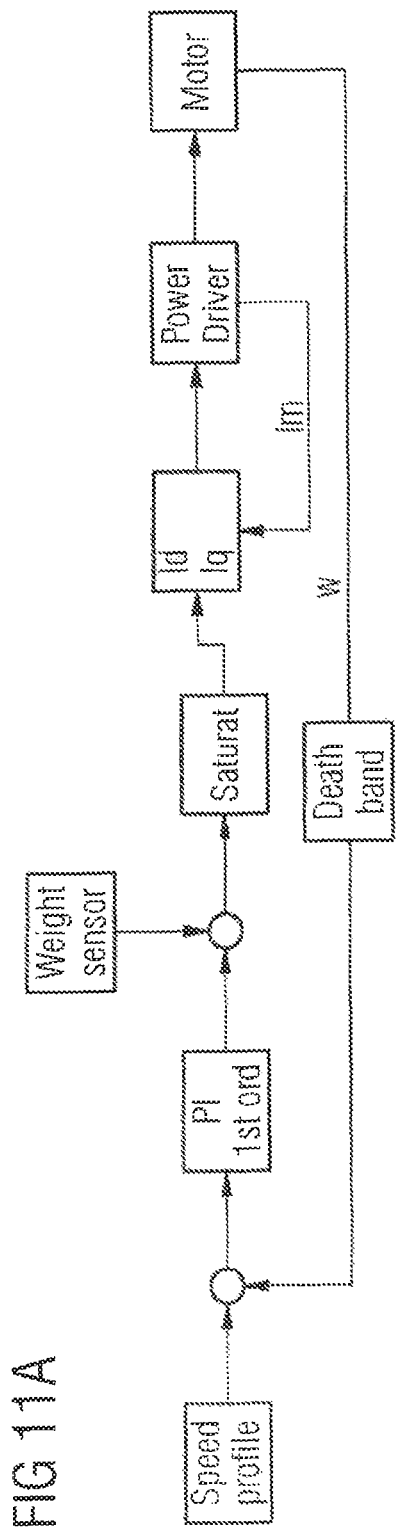
FIG. 11A shows an example of a torque and speed control.

As shown in FIGS. 11A and 11B, the lifting function is preferably controlled by the ECU, which is monitoring motor characteristics such as turning speed, readings of the weight sensors, etc. When a pallet is being loaded/unloaded, the weight sensors preferably perform readings of the weight in the cable. This reading feeds the ECU with the weight which is suspended.

The ECU preferably has then the ability to compensate the force of the cable with torque in the motor. When those are compensated, then the fail-safe brake is disengaged and the motor starts controlling the acceleration and speed of the suspended mass.

For a "down" movement, the logics preferably are the same that for the "hoist up" command For each command requested, it is possible to perform it in two speeds: Fast and Slow. A restricted hoisting function is preferably available when one phase from the Power Supply converted in the Power Supply Unit (PSU) is lost. In this case, the CME 300 would be able to lift 3.3 tons approximately.

4.3.3.4 Fleet Angle Sensing and Indication Function

The fleet angle is the maximum angle that the CME 300 is able to see in relation to the vertical. The CCS has included several means for detection these angles. This function is preferably allocated inside the CME 300.

For this fleet angle detection, several detectors preferably are introduced in the CME 300. These detectors are preferably set in different positions so they detect different angles. The fleet angle indications delivered by the CME preferably are:

Fleet angle caution
Fleet angle warning

Whenever the CME 300 cable reaches the "Fleet angle caution" detector, a signal is preferably sent to the ECU that then declares the applicable caution signal. Whenever the CME 300 reaches the "Fleet Angle Warning," a signal is preferably sent to the ECU and the applicable warning signal is triggered.

Preferably, there are 2 fleet angle warning detectors and one fleet angle caution per side of CME 300. Regarding longitudinal fleet angles, there preferably are fewer detectors: one for fleet angle warning per side and one (for fleet angle caution per assembly)

1. Whenever any "Fleet angle caution" signal is present, the operator can continue the operation but taking into account that if the fleet angle cable keeps increasing, the fleet angle warning could be triggered in any moment. There will be a dedicated signal for this caution in the EDCU display.

2. Whenever any "Fleet angle warning" signal is present, the operator will be fed with a warning (also set in the ECU display) and the operation will not be possible to be continued. Under fleet angle warning conditions, only lowering of the pallet/bulk loads is possible.

4.3.3.5 Traverse Movement Function

The traverse movement function enables the CME 300 to move the loads L from outside to inside the aircraft 1 or vice versa. This function is preferably performed by means of:
CME Electronic Control Unit
Hoist actuator
Structural elements to derive the forces generated during traverse movement phase to the Rail Assembly.

The traverse movement is preferably also fed with logics given by switches located in the rail area surroundings. They have the goal of enabling smooth speed transitions/changes, especially for the case of the rail end stops. The ECU preferably sets automatic deceleration when reaching the pre-deceleration switch, located mainly in the surroundings of the rail ends.

The traverse actuator preferably has, as the hoist actuator, a fail-safe brake. In case of absence of power or command, the brakes are applied and movement is not permitted.

4.3.3.6 Weight Indication Function

The weight may be requested to be shown in the ECU display. This weight is preferably measured by means of two dual weight sensors located in the attachment between the Hoist Actuator and the Frame Carriage.

These dual weight sensor cells preferably provide an output which is read by the ECU and converted into a display message. The weight is preferably indicated with two digits, in the form of metric tons.

4.3.3.7 Failures Indication

Whenever the CME 300 fails, it preferably declares a fail to the LMWS. This fail can be either permanent or temporary; and depending on this it will be triggered an operational failure or a system failure. The failures preferably are displayed in the LMWS.

The CME ECU display has preferably the capability of displaying several internal errors. These errors will be detailed in the supportability and maintainability documentation.

4.3.4 Interconnection Electrical Cables

As shown in FIG. 12, a wiring harness assembly compatible with the movement of crane 10 is preferably included. The festoon cable preferably connects the CME 300 to several system connectors which feed the CME 300 with power and command.

The festoon cable preferably travels aft and forward with CME 300 without interfering with CME operation.

The cable trucks preferably are integrated with the rail design to slide the cable together with the CME. The festoon cable preferably allows a longitudinal travel of the CME 300 of 6400 mm approximately.

The rest of the wiring preferably is guided by the airframe and the cargo hold rail 200 frame without disturbing the crane system 10 or any other systems.

4.3.5 Rail Actuator Installation

The rail actuator 400 is actuated to align and connect the cargo hold rail 200 and cargo door rail 100, and once connected, it actuates as a structural bar of the cargo hold rail 200 assembly.

The rail actuator 400 can be operated either electrically or manually. For that purpose, there is preferably installed a manual back-up to allow the operation with a crank from the floor of the aircraft 1.

As shown in FIG. 13A, the function of the rail actuator 400 is to move the cargo hold rail 200 assembly until it results mechanically linked to the cargo door rail 100 (the actuator 400 is not responsible for alignment between both assemblies, as this is an alignment device responsibility). In particular, FIG. 13A shows the kinematics of connected/disconnected rails.

The actuator 400 is preferably controlled externally by the RACP that is responsible for actuator commands and indication outputs from the actuator. This rails connection panel preferably includes a switch to command the actuator, as well as indicators for the status coming from the proximity switches and the actuator.

Although it is not drawn, the entire panel is preferably covered by a safety guard that prevents undesired movement from occurring.

Figure 13B:
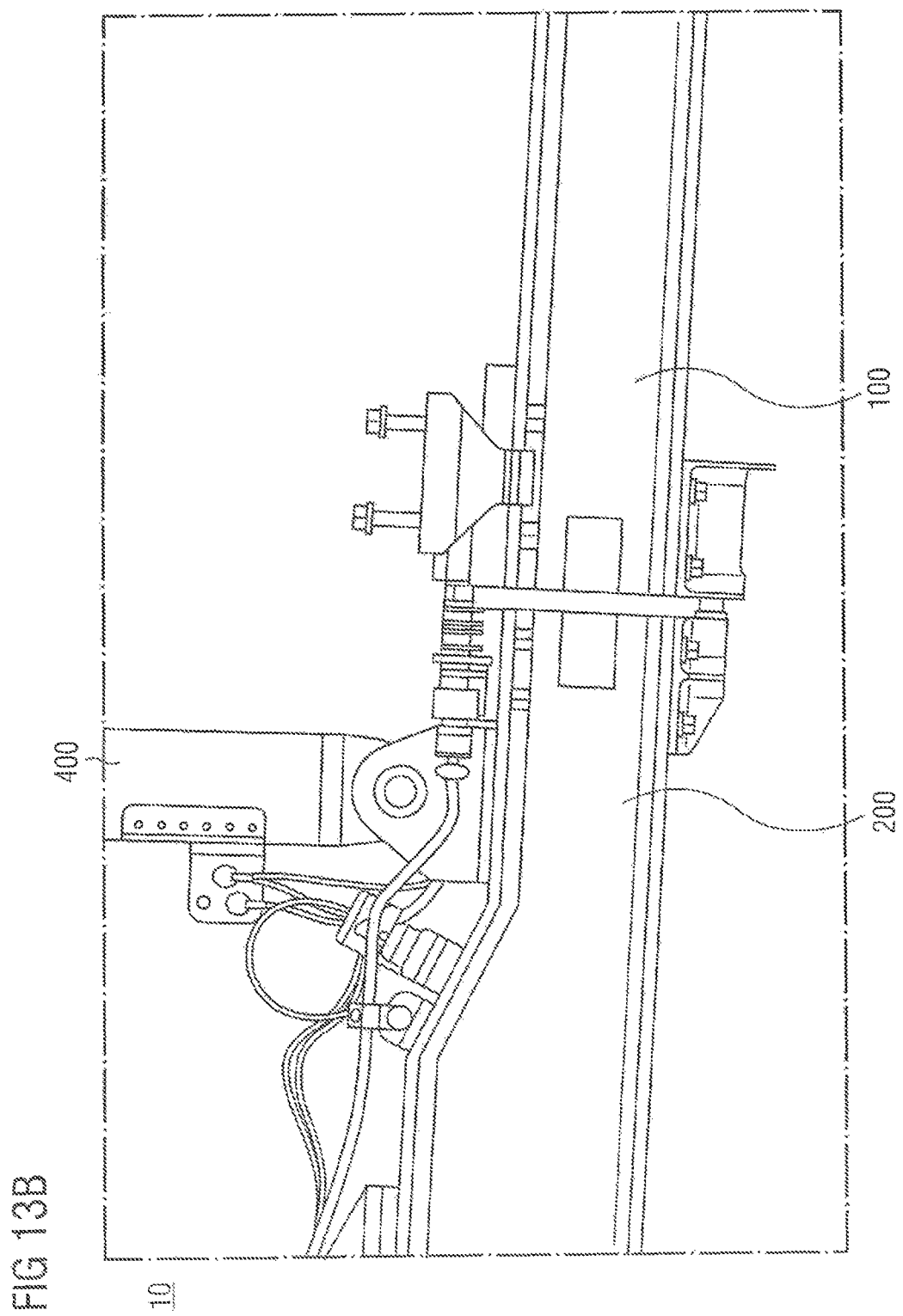
FIG. 13B shows a side view of proximity switches in relation the rails.

Still further, as shown in FIG. 13B, proximity switches are preferably fixed to the rear end of the cargo hold rail 200 and they make contact with the RWD Interface Bracket of the cargo door D when both rails are connected. The switches preferably implement logics to prevent the actuator to continue its movement when the inner rail is close to the outer rail.

When these proximity switches are pushed (e.g., because the inner rail 200 structure has gone too close to the outer rail 100), then the proximity switches preferably remove the power from the "EXTEND" command of the actuator 400. However, the "RETRACT" command remains unchanged from the proximity switches point of view, since the retraction command has a direct wire between the RACP and the actuator.

The proximity switches are preferably responsible for providing a signal that will enable the "Rails Ready for Operation" indication to be lit.

4.3.6 Load Master Control Panel & Remote Control Units (Part of LMC System)

The crane panel in the LMCP as well as hand held remote control unit preferably include the following controls:
- master switch;
- stop;
- up/down;
- aft/fwd;
- Speed-transfer
- Speed-hoisting As noted above, the LMCP and the Remote Control Units enable the operation of the crane system 10 by just one operator.

4.4 Operation/Control and Indicating

The crane 10 is preferably operated on ground only for loading and offloading. Further, the crane system 10 preferably provides electrical status indication on the LMWS for:
- system failure
- operational failure (e.g.: overload/overheat)
- CME 300 power on status (shown on RCU and LMCP)

The crane system 10 preferably is provided in order to enable autonomous loading and offloading of loads once integrated with the rails. The CME 300 preferably is capable of operating at different speeds of hoisting and transferring.

The crane 10 is preferably designed in order to operate on a sloped cargo door D of 3.5° (downwards outside) nominal. Further, the crane system 10 preferably provides electrical status indication on the LMWS for:
- system failure
- operational failure (e.g.: overload/overheat)
- CME Power on status (shown on RCU and LMCP)

To operate the CCS, there are several preconditions that need to be met:
- WOW
- cargo door D opened
- All the logics associated to the LMWS to energize the system shall be enabled
- Fleet angle does not exceed ±13.6°

Once the preconditions are met, the rail operation for extension is issued from the RACP. With the rail fully extended, the LM can release the CME's stows and hook's stow and select "Crane" from the RCU to begin the mission.

Further, the CME preferably has a weight display in order to control the loaded weight.

Loading procedure:
- The load must be stabilized under the cargo door
- Loads up to 96" (=2.4384 m) high
- Once the previous conditions are met:
- Move the CME 300 over the load L in order to use the hook.

If load has a mass between 2000 kg and 5000 kg, the LM is able to hoist and carry the load L to the ramp. If the load is below 2000 kg, then the LM can carry it inside the aircraft 1.

Offload procedure:

If load has a mass between 2000 kg and 5000 kg, the LM is preferably able to hoist it from the ramp and carry it out. Below 2000 kg the LM can carry it from inside the aircraft.

Once the previous condition is met:
Move the CME 300 over the load 1 in order to use the hook.

Carry the load out of the aircraft and place it over the ground or a transport.

A manual back up is preferably available to be operated with a crank, in case needed due to, e.g., absence of power.

4.5 Provisions

The provisions for growth capabilities in terms of hardware and interfaces are at least 5 spare connector pins and spare conductors in the wiring interface if possible. If not possible, at least 10-15% of spare pins connections are provided.

4.6 Design Precautions in Case of Specific Environmental Conditions

All the environmental requirements are considered in design, for both, internal and external components of the crane system 10. The environmental requirements shall be verified either by testing or by similarity/analysis.

4.7 Installation Concept

The crane rail structures 100, 200 preferably are attached to the ceiling and to the cargo door D.

The installation concept for the crane system 10 includes interfacing of mechanical and electrical interfaces to the aircraft structure and the aircraft electrical system. Preferably, five interface points are provided on the underside of the cargo door D for attaching the I/F Brackets to grab the door rail 100. In turn, four interface areas are preferably provided on the ceiling of the aircraft 1 (e.g., two at frame 60 and two at frame 63) to support the cargo hold rail 200 Structure.

Further, the electrical interface is preferably composed by the LMCP commands discretes and the power input from ATA24. The wiring shall be routed without causing interferences (mechanic or electromagnetic) as per normal designs and directives. System interface, installation, and tolerance drawings and documents will be referenced to attain a better installation concept.

All parts involved preferably are preassembled to the highest assembly level possible to facilitate installation on the aircraft.

All parts of the system preferably are designed to minimize impact of installation tolerances, and to ease the mounting without downgrading system performance.

Preferably, after the integration of the subassemblies, they will be placed into their respective locations as described in the corresponding interface drawings.

4.8 Interface Requirements for the Other Systems and Structure 4.8.1 External Interfaces The crane system 10 preferably interfaces with the following systems or aircraft parts:

| ATA Chapter Designation | Description of Sub-ATA | Interfaces to ATA 25-56 crane system 10 |
|---|---|---|
| 24-00 | Electrical power | E Functional (physical realization via ATA25-53 LMC) |
| 25-53 | Loadmaster Controls/LMWS | Elo MMI Load master control and remote control by means of LMWS, but also electromechanical means to join the rails if needed |
| 31-60 | Control and Display System (CDS) | Elo Functional physical realization via ATA25-53 LMC |
| 45-10 | Centralized Maintenance System (CMS) | Elo Functional (physical realization via ATA25-53 LMC) |
| 25-84 | Cargo Hold Lining | M |
| 52-33 | cargo door D | M |
| 53-40 | Rear Fuselage | M |

The following types of interfaces have been identified:
E=Electrical Interface (power supply, . . . )
Elo=Electronic Interface (bus data, . . . )
M=Mechanical (rivet, cable, moving axes)
MMI=Man Machine Interface (switch, . . . )

According to this, the crane components are provided with the following provisions for interface:
The CME 300 (including controller) preferably has:
mechanical interface to the Rails Assembly
electrical interface to the Wiring Harness
electronic interface/HMI to the Wiring Harness
The cargo door rail 100 assembly preferably has:
mechanical interface to the cargo door D
The cargo hold rail 200 assembly preferably has:
mechanical interface to the Cargo Hold Structure (ceiling)
The wiring harness preferably has:
electrical interface between crane equipment and aircraft 1 Power Distribution System
electronic interface/HMI between crane equipment and LMC system (commands)
Manual Drive Interface preferably has:
mechanical interface at the crane equipment by a crank (to be manually operated by the Load Master)

4.9 Trouble Shooting Data for Accident/Incident

The crane system 10 preferably interfaces with the LMC via LMWS, providing the status of the crane system 10. The Crane BITE function hosted on LMC preferably records the status provided by the crane, and also the status of the related ATA24 interfaces as well as inputs for the logics of operation.

4.10 Additional Definition Information 4.10.1 Crane System Operation Details

Loading/offloading with crane 10 defined procedures must be followed to assure a safe operation. Proper checks, appropriate operation sequence, limitations compliance, and stowage instructions must be accomplished.

The operator must take into account that loads heavier than 2000 kg up to 5000 kg only can be transferred to the ramp toes, while loads lighter than 2000 kg can be carried directly onto the cargo ramp. The operator must check that these required conditions are met:

General loading procedure (considering toes usage. If not necessary, the toes step can be removed) preferably comprises:

1. Once the cargo door and the ramp door have been opened, the aircraft is actuated in order to reach a correct attitude for loading/unloading operation (kneeling+struts and toes deployment).

Note that ramp toes can be easily used on prepared and compacted fields, but shoring activities could be needed in non-prepared fields. Also shoring tasks can be needed for stabilizer struts in non-prepared fields. With standard preparation (leveling aircraft 1 and struts deployed), the aircraft 1 floor will be leveled, and the rail has a nominal angle of 3.5° approximately.

2. The pallet/bulk load must be placed inside the lifting envelope of the hook and below the cargo door (or truck aligned/perpendicular to the longitudinal x-axis of the aircraft). This is responsibility of the ground operator.

3. Inner rail structure actuation is performed to assure continuity between supporting structures.

4. The Crane Mobile Equipment is placed above the load (pallet arresting point must be inside the hook working envelope)

5. The hook is lowered and attached to the pallet/load. At this moment, before lifting the load, the operator must check that the fleet angle of the hoist is not above the allowed angle (if it is not inside the envelope allowed, take corrective actions). Then the load is lifted by the mobile equipment until the necessary height is achieved (until the pallet clears the cargo ramp floor). Terminal phases of the lifting (taking off and arrival to the highest height, must be carried out at low hoisting speed).

6. The mobile equipment is commanded FWD until the load is above the deployment point (cargo ramp/cargo ramp toes).

7. The load is then lowered and placed between the ramp toes and the cargo ramp.

8. The hook is de-attached and lifted again. Then, the mobile equipment can be either moved to the stowage position if the loading process has been finished, or moved to the loading initial position again if the loading operation has to be continued. When finished, the operator commands the CME to the stowage position, the cargo hold structure to retract position, and then the system is powered off Toes struts, ramp toes, and ramp and cargo door are configured to the initial positions.

Unloading:

Unloading process is analog to the loading operation. The load must be located on the toes previously to be lifted by the crane (not necessary for loads lighter than 2000 kg).

5. Performances

The present disclosure provides one or more of the following advantages:

The crane 10 preferably must ensure operation on a sloped Cargo Door) (3.5°). Considering the tolerances (+/−2.0°), operation must be assured between 1.5° and 5.5°.

The crane 10 preferably ensures hoisting and transferring operation of loads up to 5,000 kg.

The CCS preferably is able to pick loads L from/to a truck whose bed height is between 0.8 and 1.7 meters.

The CME preferably is capable of operating at different speeds:

The hoisting speeds will be 4 m/min and 0.6 m/min.

The transfer speeds will be 18 m/min and 3 m/min.

It is believed that the advantages of the technique presented herein will be fully understood from the foregoing description, and it will be apparent that various changes may be made in the form, constructions and arrangement of the exemplary aspects thereof without departing from the scope of the present disclosure or without sacrificing all of its advantageous effects. Because the technique presented herein can be varied in many ways, it will be recognized that the present disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mono-rail crane system for use in an aircraft, the crane system enabling the transfer of a load from outside the aircraft into the aircraft and vice versa, and comprising:
    a first longitudinal mono-rail configured to be installed on the underside of a rear cargo door of the airplane parallel to the longitudinal axis of the rear cargo door;
    a second longitudinal mono-rail, which is:
        configured to be installed on a cargo hold ceiling of the aircraft, and
        in the fully opened state of the rear cargo door, in aligned continuity with the first longitudinal mono-rail so that the longitudinal axes of the first and second longitudinal mono-rails coincide to form one common longitudinal axis;
    a crane mobile equipment, CME, configured to be movable along the first and second longitudinal mono-rails to hoist and transfer the load; and
    a linear actuator configured to advance and retreat the second longitudinal monorail towards and away from the first longitudinal monorail.

2. The crane system of claim 1, wherein in the fully opened state of the rear cargo door, the common longitudinal axis is less than a predetermined angle in relation to a horizontal plane of the aircraft, the horizontal plane containing the center line of the fuselage of the airplane.

3. The crane system of claim 2, wherein the predetermined angle is in the range of 1.5° to 5.5°.

4. The crane system of claim 2, wherein the load has a weight of up to 5000 kg.

5. The crane system of claim 1, wherein the first longitudinal mono-rail comprises a plurality of tracks, each track being mounted on slide brackets, which slide brackets are attached to interface fittings to be received in interface holes in the rear cargo door.

6. The crane system of claim 1, wherein the CME is:
    during flight mode, secured in a stowage position at the proximal end of the second longitudinal monorail, and
    during operational mode, able to move between the stowage position and the distal end of the first longitudinal mono-rail.

7. The crane system of claim 6, wherein the first and second longitudinal mono-rails each comprise a rolling surface for the CME.

8. The crane system of claim 7, wherein the rolling surfaces are one of:
    substantially flat, and
    formed in the form of a toothed rack, so as to engage with the CME.

9. The crane system of claim 5, wherein the CME further comprises a wheel mechanism to compensate for a displacement between the tracks and a further displacement at the transition between the first and second longitudinal mono-rails.

10. The crane system of claim 5, wherein the CME further comprises an attaching device configured to physically displace an arresting point between the CME and the load.

11. The crane system of claim 1, further comprising a cargo hold rail assembly above the second longitudinal mono-rail configured to structurally support the second longitudinal mono-rail.

12. The crane system of claim 11, wherein the linear actuator forms a part of the cargo hold rail assembly and is configured to act as an additional rod of the assembly.

13. The crane system of claim 11, wherein the cargo hold rail assembly is configured to be installed on the cargo hold ceiling above the rear ramp area of the airplane.

14. The crane system according to claim 5, wherein:
    a most proximal slide bracket of the first longitudinal mono-rail is configured as a female locator housing, and
    a most distal bracket of the second longitudinal mono-rail is configured as a male alignment device to establish the aligned continuity between the first and second longitudinal upon advancing movement of the linear actuator.

15. A method of operating a mono-rail crane system for use in an aircraft, the crane system enabling the transfer of a load from outside the aircraft into the aircraft and vice versa, wherein the crane system comprises a first longitudinal mono-rail installable on the underside of a rear cargo door of the airplane parallel to the longitudinal axis of the rear cargo door, a second longitudinal mono-rail, which is installable on a cargo hold ceiling of the aircraft, and, in the fully opened state of the rear cargo door, in aligned continuity with the first longitudinal mono-rail so that the longitudinal axes of the first and second longitudinal mono-rails coincide to form one common longitudinal axis, a crane mobile equipment, CME, configured to be movable along the first and second longitudinal mono-rails in order to hoist and transfer the load, and a linear actuator configured to advance and retreat the second longitudinal monorail towards and away from the first longitudinal monorail, the method comprising the steps of:

during flight mode, securing the CME at the proximal end of the second longitudinal mono-rail in a stowage position;

during flight mode, retreating the second longitudinal mono-rail so as to allow closing the rear cargo door;

during operation mode, advancing the second longitudinal mono-rail so as to establish the common longitudinal axis; and during operation mode, releasing the CME so as to be movable between the stowage position and a distal end of the first longitudinal mono-rail.

* * * * *